(12) United States Patent
Zibaeenejad et al.

(10) Patent No.: US 12,149,610 B2
(45) Date of Patent: Nov. 19, 2024

(54) METHODS, APPARATUSES, AND COMPUTER-READABLE STORAGE MEDIA FOR DATA AUTHENTICATION AND ERROR CORRECTION USING ERROR-TOLERANT MESSAGE AUTHENTICATION CODE

(71) Applicant: HUAWEI TECHNOLOGIES CO., LTD., Guangdong (CN)

(72) Inventors: Ali Zibaeenejad, Waterloo (CA); Mohamed Tolba, Kitchener (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 247 days.

(21) Appl. No.: 17/718,631

(22) Filed: Apr. 12, 2022

(65) Prior Publication Data

US 2023/0327854 A1 Oct. 12, 2023

(51) Int. Cl.
| | |
|---|---|
| H04L 29/06 | (2006.01) |
| H04L 9/06 | (2006.01) |
| H04L 9/08 | (2006.01) |
| H04L 9/30 | (2006.01) |

(52) U.S. Cl.
CPC .......... *H04L 9/0643* (2013.01); *H04L 9/0631* (2013.01); *H04L 9/0637* (2013.01); *H04L 9/0825* (2013.01); *H04L 9/3026* (2013.01)

(58) Field of Classification Search
CPC ... H04L 9/0643; H04L 9/0631; H04L 9/0637; H04L 9/0825; H04L 9/3026; H04L 63/12; H04L 63/123; H04L 9/06; H04L 9/0618; H04L 9/0625; H04L 9/065; H04L 9/3006; G06F 21/64
See application file for complete search history.

(56) References Cited

U.S. PATENT DOCUMENTS

| | | | | |
|---|---|---|---|---|
| 2013/0326224 A1* | 12/2013 | Yavuz | ................... | H04L 9/3247 713/176 |
| 2017/0085377 A1* | 3/2017 | Pogmore | ............... | H04L 9/0869 |
| 2023/0014199 A1* | 1/2023 | Yoon | ..................... | H04W 12/03 |

* cited by examiner

*Primary Examiner* — Malcolm Cribbs
(74) *Attorney, Agent, or Firm* — Locke Lord LLP; Tim Tingkang Xia, Esq.

(57) ABSTRACT

An encoder for encrypting a plaintext into a ciphertext. The encoder has an encoding submodule for acting as a deterministic random bit generator (DRBG) in an offline mode for generating one or more hash-key value candidates, and for acting as a stream encryptor in an online mode for encrypting the plaintext into the ciphertext; a hash key selector for selecting a hash-key value H from the one or more hash-key value candidates; and a hash submodule for generating a MAC tag using at least the ciphertext and the selected hash-key value H. A corresponding decoder is also provided.

20 Claims, 8 Drawing Sheets

METHODS, APPARATUSES, AND COMPUTER-READABLE STORAGE MEDIA FOR DATA AUTHENTICATION AND ERROR CORRECTION USING ERROR-TOLERANT MESSAGE AUTHENTICATION CODE

RELATED APPLICATIONS

The present disclosure is a first patent application related to the disclosed technology.

FIELD OF THE DISCLOSURE

The present disclosure relates generally to an encryption and/or a decryption module (or an "encoder" or a "decoder"), apparatus, system and method, and in particular to an authenticated encryption and/or a verified and/or error-corrected decryption module, apparatus, system and method using error-tolerant message authentication code.

BACKGROUND

For ease of reading, subsection C of the Detailed Description lists the acronyms used in this disclosure. Subsection D of the Detailed Description lists the references cited herein, the content of each of which is incorporated herein by reference in its entirety.

Error-tolerant message authentication code (ETMAC) combines the functionalities of both error correctability and message authentication code into one functionality. There are two general approaches to make an ETMAC: (1) to employ a typical message authentication code (MAC) such as the Galois message authentication code (GMAC) (see Reference [R1]), which is originally designed for the data integrity and then to establish a decoder which can take the benefit of the integrity tag as a parity for the error correction at the decoder (see References [R2] and [R3]); (2) to employ a typical Forward Error Correction (FEC) such as the Reed Solomon (RS) code, which is originally designed for the error correction, and then to establish an integrity tag generator from the parity code bits at the encoder to have an integrity tag based on the parity code, and finally to design an integrity verifier inside the FEC decoder (see References [R4] to [R8]).

Message Authentication, Galois Integrity and Correction (MAGIC) (see Reference [R3]) may be considered as a mode for authenticated encryption (AE) where three functionalities, namely, encryption, message authentication, and error correction are supported simultaneously using the same code (also denoted a tag). This code or tag is used for the purpose of ensuring cryptographic integrity and as a parity for error correction. A Galois hash function is used in MAGIC to build the MAC and at the same time its bit linearity is used to perform error correction in a way that is similar to other codes (for example, the Reed Solomon code).

SUMMARY

Embodiments disclosed herein relate to encryption and decryption with an error-tolerant message authentication code (ETMAC) that employs a message authentication code (MAC) such as the Galois message authentication code (GMAC).

According to one aspect of this disclosure, there is provided a module, a circuitry, an apparatus, and/or a system. The module, circuitry, apparatus, and/or system comprises a processor for executing an encryption process and/or a decryption process for encrypting a plaintext into a ciphertext with an ETMAC and/or decrypting a ciphertext with an ETMAC into a plaintext.

The module, circuitry, apparatus, system, and associated encryption and decryption processes disclosed herein provide significant performance and security advantages.

According to one aspect of this disclosure, there is provided an encoder for encrypting a plaintext into a ciphertext with an ETMAC. The encoder comprises an encoding submodule acting as a deterministic random bit generator (DRBG) in an offline mode for generating one or more hash-key value candidates, and as a stream encryptor (or simply an "encryptor") in an online mode for encrypting the plaintext into the ciphertext. The encoder also comprises a hash submodule for generating a MAC tag to be used by a corresponding decoder for message authentication/verification, error detection, and error correction, using at least the ciphertext and a hash-key value H selected by a hash key selector submodule from the one or more hash-key value candidates generated by the DRBG of the encoding submodule. More specifically, the hash key selector tests the generated one or more hash-key value candidates to determine whether it can correct errors.

In some embodiments, the encoding submodule comprises a first circuit for operating as the DRBG in the offline mode and a second circuit for operating as the stream encryptor in the online mode, and at least a major portion of the first circuit is the same as a major portion of the second circuit.

In some embodiments, the encoder comprises a stream encryptor as the encoding submodule. The stream encryptor is configured for acting as the DRBG in the offline mode for generating one or more hash-key value candidates, and is configured for encrypting the plaintext into the ciphertext in the online mode.

In some embodiments, the architecture or circuit of the encoder may comply with the Galois counter mode/Galois message authentication code (GCM/GMAC) encryptor described in Reference [R1]. As those skilled in the art will appreciate, the GCM/GMAC encryptor comprises an Advanced Encryption Standard (AES)-counter mode (AES-CTR) encryption function or submodule and a GHASH function or submodule. In these embodiments, the AES-CTR encryption function is used in the encoding submodule as the stream encryptor (in the online mode receiving the plaintext as input and encrypting the plaintext into the ciphertext) and as the DRBG (in the offline mode receiving a stream encryption key K and a nonce IV and generating the hash-key value candidates), and the hash submodule is based on the GHASH function for generating the MAC tag for authentication. As those skilled in the art understand, the GHASH submodule of GCM/GMAC uses an additional input block (constructed from the lengths of the additional authenticated data (AAD) and ciphertext) for computing the tag. In some embodiments, the tag generation of the encoder disclosed herein does not use such an additional input block as these lengths are fixed and agreed between the encoder and decoder in advance.

According to one aspect of this disclosure, there is provided a decoder for using a received MAC tag for verifying message authentication of a ciphertext, detecting and correcting errors in the ciphertext and/or the MAC tag, and decrypting the ciphertext into a plaintext. The decoder comprises a decoding submodule acting as a DRBG in an offline mode for generating one or more hash-key value candidates, and as a stream decryptor in an online mode for decrypting the ciphertext into the plaintext. The decoder also comprises a hash submodule for generating a MAC tag for message authentication, error detection, and error correction, using at least the ciphertext and a hash-key value H selected by a hash key selector from the one or more hash-key value candidates generated by the DRBG of the decoding submodule.

In some embodiments, the decoding submodule comprises a first circuit for operating as the DRBG in the offline mode and a second circuit for operating as the stream decryptor in the online mode, and at least a major portion of the first circuit is the same as a major portion of the second circuit.

In some embodiments, the decoder comprises a stream decryptor as the decoding submodule. The stream decryptor is configured for acting as the DRBG in the offline mode for generating one or more hash-key value candidates, and is configured for decrypting the ciphertext into the plaintext in the online mode.

In some embodiments, the architecture or circuit of the decoder may comply with the GCM/GMAC decryptor described in Reference [R1] and comprise additional components such as an error detector and an error corrector that are not part of GCM/GMAC.

According to one aspect of this disclosure, there is provided a coder for converting a first text into a second text, one of the first and second texts being a plaintext and the other of the first and second texts being a ciphertext, the coder comprising: a coding submodule for operating as a deterministic random bit generator (DRBG) in an offline mode for generating one or more hash-key value candidates, and for operating as a stream coder in an online mode for converting the first text into the second text; a hash key selector for selecting a hash-key value from the one or more hash-key value candidates; and a hash submodule for generating a MAC tag using at least the ciphertext and the selected hash-key value.

In some embodiments, the coding submodule comprises a first circuit for operating as the DRBG in the offline mode and a second circuit for operating as the stream coder in the online mode; and at least a major portion of the first circuit is same as a major portion of the second circuit.

In some embodiments, the coding submodule comprises a stream coder for operating as the DRBG in the offline mode and for converting the first text into the second text in the online mode.

In some embodiments, the coding submodule comprises an Advanced Encryption Standard (AES)-counter mode (AES-CTR) encryption or decryption submodule for operating as the DRBG in the offline mode and for operating as the stream coder in the online mode.

In some embodiments, the hash submodule is configured for generating a MAC tag based on a GHASH function using at least the ciphertext and the selected hash-key value.

In some embodiments, the hash submodule comprises: a hash generator for generating a hash output using at least the ciphertext and the selected hash-key value; and a hash randomizer for generating the MAC tag or a hash de-randomizer for generating a de-randomized output; the coding submodule is configured for generating a first key using a nonce IV in the online mode; the hash randomizer is configured for using the first key generated by the coding submodule and the hash output to generate the MAC tag; and the hash de-randomizer is configured for using the first key generated by the coding submodule and the MAC tag to generate the de-randomized output.

In some embodiments, the coding submodule is configured for generating the first key by encrypting $(IV\|0^{31}\|1)$ using a second key.

In some embodiments, the hash randomizer is configured for performing an addition of the first key and the hash output in a Galois Field $GF(2^N)$ to generate the MAC tag.

In some embodiments, the addition of the first key and the hash output in the Galois Field $GF(2^N)$ is an N-bit exclusive-OR (XOR) operation.

In some embodiments, the hash submodule further comprises a cache for storing the selected hash-key value and an inverse of the selected hash-key value in the Galois Field $GF(2^N)$.

In some embodiments, the hash key selector is configured for: for each hash-key value candidate H, calculating $(e \times H^{-k})$ and $(e \times H^k)$ for all errors e not equal to zero and having a Hamming weight less than or equal to a threshold t (representing the maximum number of errors that can be corrected in one block) and for all k where $1 \leq k \leq n-1$; and if the Hamming weights of $(e \times H^{-k})$ and $(e \times H^k)$ are greater than t, selecting the hash-key value candidate H as the selected hash-key value.

In some embodiments, said calculating $(e \times H^k)$ comprises: calculating $H^k$ for $1 \leq k < n$ as $H^1 = H$ or $H^k = H^{k-1} \times H$ for $1 < k < n$; calculating and storing $e_1 \times H^k, e_2 \times H^k, \ldots, e_N \times H^k$ using shift and add (that is, XOR) operations, where $e_i$ represents a vector of all zero bits except a bit-one at location i (i=1, 2, \ldots, N); and calculating $(e \times H^k)$ based on the stored $e_1 \times H^k, e_2 \times H^k, \ldots, e_N \times H^k$ and using add operations.

In some embodiments, said calculating and storing $e_1 \times H^k, e_2 \times H^k, \ldots, e_N \times H^k$ comprises: if $e = e_1 = 1 = (000 \ldots 01)_2$ in $GF(2^{128})$, then $e \times H^k = H^k$; and if $e = e_i = 2^{i-1} = (0 \ldots 010 \ldots 00)_2$ in $GF(2^{128})$, then $e \times H^k = e_i \times H^k = GFAdd((e_{i-1} \times H^k) \ll 1, g_{msb})$, where $i = 2, 3, 4, \ldots, N$, $$GF \text{ Add}((x \ll 1), g_{msb}) = \begin{cases} GF \text{ Add}((x \ll 1), g), & msb(x) = 1 \\ x \ll 1, & msb(x) = 0 \end{cases}$$

msb(x) represents the most significant bit of x, $x \ll 1$ represents the shift of x for 1 bit to the left, and $f_N(x) = x^{128} + g(x)$, where g(x) is a polynomial with the degree less than 128, and $f_N(x)$ is an irreducible polynomial for calculating the hash output $T = h_H(C_1, \ldots, C_n) = \sum_{i=1}^{n} C_i H^{n+1-i} \mod f_N(x)$.

In some embodiments, the coder is a decoder for decrypting the ciphertext into the plaintext; the coding submodule is a decoding submodule for acting as the DRBG in the offline mode for generating the one or more hash-key value candidates, and for acting as a stream decryptor in the online mode for decrypting the ciphertext into the plaintext; the decoder comprises the hash de-randomizer; and the decoder further comprises: an error detector for detecting one or more errors in the ciphertext and/or the MAC tag using the selected hash-key value, the hash output, and the de-randomized output, and generating one or more syndromes; a verifier for assessing the syndromes and verifying if the detected one or more errors are correctable; and an error corrector for correcting the detected one or more errors and outputting the error-corrected ciphertext to the decoding submodule if the verifier determines that the detected one or more errors are correctable.

In some embodiments, each of the ciphertext and the MAC tag comprises a plurality of blocks; and the verifier is configured to determine that the detected one or more errors are correctable if the one or more errors are in a same block and if a total number of the detected one or more errors is smaller than or equal to a predefined threshold.

In some embodiments, the decoder is configured for performing a process having the steps of:
(1) fetching from a storage an inverse $H^{-1}$ of the selected hash-key value in a Galois Field $GF(2^N)$ and setting a flag to a first value;
(2) computing $S_{n+1}$ as an XOR of the hash output and the de-randomized output;
(3-1) if a Hamming weight of $S_{n+1}$ is zero, setting a flag to a second value, sending the ciphertext to the coding submodule for decryption and terminating the process;
(3-2) if the Hamming weight of $S_{n+1}$ is smaller than or equal t, setting the flag to the second value,
(4) setting j=n,
(4-1) computing $S_j$ as $S_{j+1} \times H^{-1}$,
(4-2) if the Hamming weight of $S_j$ is smaller than or equal to a threshold t, then
(4-2a) if no r and $S_r$ have been previously recorded, recording j and $S_j$ as the r and $S_r$ and go to step (4-1) for a next j=j−1 until all j's in the range of 1≤j≤n are traversed or the process is terminated in step (4-2b),
(4-2b) if the r and $S_r$ have been previously recorded, then go to step (5-2),
(5) if all j's in the range of 1≤j≤n are traversed,
(5-1) if the r and $S_r$ have been previously recorded, setting a flag to the second value, sending the recorded r and $S_r$ to the error corrector for correcting errors in the ciphertext, and terminating the process,
(5-2) if the flag is the second value, then sending the ciphertext to the coding submodule for decryption and terminating the process, and
(5-3) rejecting the ciphertext.

According to one aspect of this disclosure, there is provided a method for converting a first text into a second text, one of the first and second texts being a plaintext and the other of the first and second texts being a ciphertext, the method comprising: generating one or more hash-key value candidates using a DRBG in an offline mode; selecting a hash-key value from the one or more hash-key value candidates; converting the first text into the second text in an online mode; and generating a MAC tag using at least the ciphertext and the selected hash-key value.

In some embodiments, the method further comprises: generating a hash output using at least the ciphertext and the selected hash-key value; generating the MAC tag or a de-randomized output; and generating a first key using a nonce IV in the online mode. Said generating the MAC tag or the de-randomized output comprises: using the first key and the hash output to generate the MAC tag, or using the first key and the MAC tag to generate the de-randomized output.

According to one aspect of this disclosure, there is provided one or more non-transitory computer-readable storage devices comprising computer-executable instructions for converting a first text into a second text, one of the first and second texts being a plaintext and the other of the first and second texts being a ciphertext, wherein the instructions, when executed, cause a processor to perform actions comprising: generating one or more hash-key value candidates using a DRBG in an offline mode; selecting a hash-key value from the one or more hash-key value candidates; converting the first text into the second text in an online mode; and generating a MAC tag using at least the ciphertext and the selected hash-key value.

In some embodiments, the instructions, when executed, cause the processor to perform further actions comprising: generating a hash output using at least the ciphertext and the selected hash-key value; generating the MAC tag or a de-randomized output; and generating a first key using a nonce IV in the online mode. Said generating the MAC tag or the de-randomized output comprises: using the first key and the hash output to generate the MAC tag, or using the first key and the MAC tag to generate the de-randomized output.

According to one aspect of this disclosure, there is provided a system comprising the above-described encoder/decoder/coder.

In some embodiments, the encoder/decoder/coder and the system comprising same (denoted the "ETMAC" for ease of description) provide an improvement to Message Authentication, Galois Integrity and Correction (MAGIC).

In some embodiments, the ETMAC disclosed herein improves the efficiency and flexibility of MAGIC (see Reference [R3]) and in compliance with existing Galois counter mode/Galois message authentication code (GCM/GMAC) standard. Compared to MAGIC, the ETMAC disclosed herein provides various advantages such as:

The ETMAC disclosed herein does not require hash key agreement phase between the encoder and the decoder, which is achieved by using a DRBG at the encoder and at the decoder from existing MAC circuit in offline mode.

The ETMAC disclosed herein provides new methods and data structures for selecting the hash-key value H with a speed higher than MAGIC.

Compared to MAGIC, the ETMAC disclosed herein requires only ⅓ of RAM memory for identifying error correctability capability, and error locations at the decoder.

In addition to the above advantages, the ETMAC disclosed herein supports any length of additional authenticated data (AAD) and does not require that the AAD always needs to be correct.

In some embodiments, the ETMAC disclosed herein adds error correction code (ECC) features to GCM/GMAC to provide reliability in addition to confidentiality and integrity. More specifically, the ETMAC disclosed herein provides the ECC features by using:

The DRBG mechanism: The encoder and decoder comprises a DRBG mechanism to agree on the same hash-key value H without extra communication. Such a mechanism does not impose extra hardware complexity (such as gate equivalent (GE) circuit area) to the existing GCM/GMAC hardware. This mechanism does not exist in GCM/GMAC and MAGIC.

A fast hash-key value selection method for the hash key selector: The fast hash-key value selection method provides outstanding performance than the hash-key selection method of MAGIC (for example a faster computation for identifying whether or not a hash key value is valid).

The structure of the decoder: with the structure of the decoder disclosed herein, the decoder uses less memory buffer than existing MAGIC to identify error correctability capability and error locations.

In addition, the ETMAC disclosed herein also support any length of AAD and may correct errors in the AAD blocks. This is an advantage comparing with MAGIC which supports only a single block of AAD and assumes that it is always error-free.

With above-described performance and security advantages, the module, circuitry, apparatus, system, and associated encryption and decryption processes disclosed herein may be suitable for use in various applications that require fast and efficient authenticated encryption and/or fast and efficient decryption with verification. The module, circuitry, apparatus, system, and associated encryption and decryption processes disclosed herein may also be suitable for use in constraint devices (such as Internet-of-Things (IoT) devices, smart TVs, and/or the like) with no or disabled hardware acceleration.

DETAILED DESCRIPTION

Figure 1:
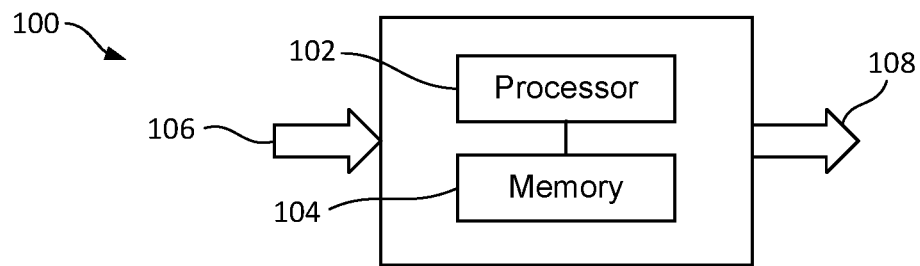
FIG. 1 is a simplified schematic diagram showing the hardware structure of an encoder and/or decoder, according to some embodiments of this disclosure.

Embodiments disclosed herein relate to an encoder module (or simply denoted an "encoder") or circuitry and/or a decoder module or circuitry (or simply denoted a "decoder") for executing an encryption process with authentication and/or a decryption process with verification for performing data encryption and/or decryption.

As will be described later in more detail, a "module" is a term of explanation referring to a hardware structure such as a circuitry implemented using technologies such as electrical and/or optical technologies (and with more specific examples of semiconductors) for performing defined operations or processing. A "module" may alternatively refer to the combination of a hardware structure and a software structure, wherein the hardware structure may be implemented using technologies such as electrical and/or optical technologies (and with more specific examples of semiconductors) in a general manner for performing defined operations or processing according to the software structure in the form of a set of instructions stored in one or more non-transitory, computer-readable storage devices or media.

A module may be implemented as a part of a device. Alternatively, a module itself may be implemented as a device. A module may comprise one or more submodules. Herein, a submodule is a term of explanation referring to a module of another module. Similar to a module, a submodule may be a hardware structure such as a circuitry or the combination of a hardware structure and a software structure.

As will be described in more detail below, the encoder/decoder may be a part of a device, an apparatus, a system, and/or the like, wherein the encoder/decoder may be coupled to or integrated with other parts of the device, apparatus, or system such that the combination thereof forms the device, apparatus, or system. Alternatively, the encoder/decoder may be implemented as a standalone encryption/decryption device or apparatus.

The encoder/decoder executes an authentication encryption process (that is, encryption with authentication) and/or a verification decryption process (that is, decryption with verification) for performing data encryption and/or decryption with authentication/verification. Herein, a process has a general meaning equivalent to that of a method, and does not necessarily correspond to the concept of computing process (which is the instance of a computer program being executed). More specifically, a process herein is a defined method implemented using hardware components for process data (for example, encrypting a message, decrypting a message, generating a message-authentication code (MAC) tag (described in more detail later), and/or the like). A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the encryption and decryption processes disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. The encoder/decoder may read the computer-executable code from the storage devices and execute the computer-executable code to perform the encryption and/or decryption processes.

Alternatively, the encryption and/or decryption processes disclosed herein may be implemented as one or more hardware structures having necessary electrical and/or optical components, circuits, logic gates, integrated circuit (IC) chips, and/or the like.

A. HARDWARE STRUCTURE

Turning now to FIG. 1, an encoder/decoder is shown and is generally identified using reference numeral 100. In various embodiments, the encoder/decoder 100 may be an encoder or an encoding module for authenticating encrypting one or more plaintexts P (also denoted "messages" hereinafter) into one or more ciphertexts C with optional inclusion of additional authenticated data (AAD) A, and for generating a tag for authentication, integrity check and error correctability, a decoder or a decoding module for receiving one or more ciphertexts C, a tag, and optionally AAD A, verifying the integrity of the one or more ciphertexts C and the optional AAD A using the tag, correcting errors in the ciphertexts C and the optional AAD A (if the errors are correctable), and decrypting the one or more ciphertexts C into one or more plaintexts P, or an encoding and decoding module for encrypting or decrypting data (which may be plaintexts P when encrypting or ciphertexts C when decrypting) with authentication/verification, and error-correction, under respective instructions.

In other words, one may only implement the authentication encryption portion of the encoder/decoder 100 (that is, as an encoder or encoding module without the decryption function) for encrypting one or more plaintexts P into one or more ciphertexts C with authentication, and rely on other people to implement the corresponding decryption portion of the encoder/decoder 100 for decrypting one or more ciphertexts C back to the one or more plaintexts P with verification and error-correction.

Alternatively, one may only implement the verification decryption portion of the encoder/decoder 100 (that is, as a decoder or decoding module without the encryption function) for decrypting one or more ciphertexts C into one or more plaintexts P with verification and error-correction wherein the one or more ciphertexts C are encrypted from the one or more plaintexts P by a corresponding encoder implemented by other people.

Yet alternatively, one may implement both the authentication encryption and verification and error-correction decryption portions of the encoder/decoder 100 (that is, with both the authentication encryption and verification/error-correction decryption functions) for encrypting one or more plaintexts P into one or more ciphertexts C with authentication, and decrypting the one or more ciphertexts C back to the one or more plaintexts P with verification and error-correction at a later time and/or another location.

As shown in FIG. 1, the encoder/decoder 100 comprises a processor 102 functionally coupled to a memory component 104, one or more input circuits 106 (also denoted as "input" for simplicity), and one or more output circuits 108 (also denoted as "output" for simplicity) using electrical and/or optical technologies. The encoder/decoder 100 may also comprise other components as needed, such as one or more buses, one or more controller circuits, and/or the like.

The processor 102 comprises necessary circuitries implemented using technologies such as electrical and/or optical hardware components for executing an encryption process and/or a decryption process, as the design purpose and/or the use case maybe, for encrypting and/or decrypting data received from the input 106 and outputting the resulting encrypted or decrypted data through the output 108.

For example, the processor 102 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processor 102, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processor 102 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processor 102 is usually of no use without meaningful firmware and/or software.

Of course, those skilled in the art will appreciate that a process or a function (and thus the processor 102) may be implemented using other technologies such as analog technologies.

Therefore, the modules, circuitries, the processor 102, and other components described herein generally produce tangible results tied to the physical world, wherein the tangible results such as those described herein may lead to improvements to computers and systems, computing devices and systems, and/or the like, such as network systems having a plurality of server computers and a plurality of client computing devices.

Referring back to FIG. 1, in various embodiments, the processor 102 may be a specialized circuitry implemented as one or more individual circuits, a specialized circuitry implemented as one or more ICs using suitable technologies such as application specific integrated circuits (ASICs), field-programmable gate array (FPGA), and/or the like, a specialized processor, or a general purpose processor such as an INTEL® microprocessor (INTEL is a registered trademark of Intel Corp., Santa Clara, CA, USA), an AMD® microprocessor (AMD is a registered trademark of Advanced Micro Devices Inc., Sunnyvale, CA, USA), an ARM® microprocessor (ARM is a registered trademark of Arm Ltd., Cambridge, UK) manufactured by a variety of manufactures under the ARM® architecture, or the like.

The memory component 104 is generally used for storing data such as the input data, the data generated during the operation of the processor 102, and/or the output data. In various embodiments, the memory component 104 may be a circuitry implemented as one or more individual circuits or a circuitry implemented as one or more ICs. In some embodiments, the memory 104 may be integrated with the processor 102 in a single IC. In some other embodiments, the memory component 104 may be separated from the processor 102 but functionally coupled thereto.

Figure 2:
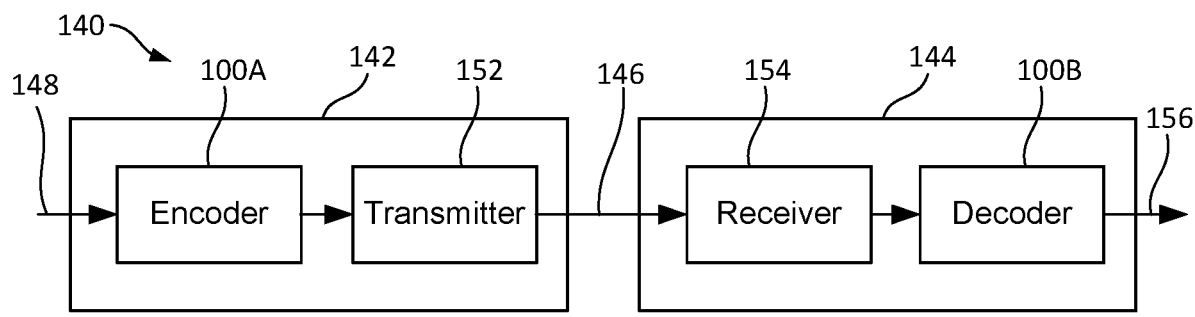
FIG. 2 is a simplified schematic diagram of a secure communication system having a transmitting device in communication with a receiving device via a communication channel, wherein the transmitting and receiving devices respectively comprise an encoder and a decoder having the structure shown in FIG. 1, according to some embodiments of this disclosure.

In various embodiments, the encoder/decoder 100 may be used in various secure systems and/or devices for data encryption and/or decryption. For example, FIG. 2 is a simplified schematic diagram of a secure communication system 140 having a transmitting device 142 in communication with a receiving device 144 via a communication channel 146 such as an electrical cable, a fiber optic cable, a space, and/or the like.

In this example, the transmitting device 142 comprises an encoder 100A functionally coupled to a transmitter 152. The encoder 100A receives an input 148 having one or more plaintexts P, and optionally other data (such as AAD A), and encrypts the received plaintexts P into ciphertexts C and a tag for authentication and error correction. The encoder 100A outputs the ciphertexts C, the tag, and other data to the transmitter 152, which in turn transmits the data received from the encoder 100A to the receiving device 144 via the communication channel 146.

The receiving device 144 comprises a receiver 154 functionally coupled to a decoder 100B. The receiver 154 receives data transmitted from the transmitting device 142 and forward the received data (which comprises ciphertexts C, the tag, and optionally other data such as the AAD A) to the decoder 100B. The decoder 100B then verifies the integrity of the ciphertexts C and the optional other data such as the AAD A, corrects errors therein (if errors can be corrected), and decrypts the ciphertexts C into one or more plaintexts P and outputs the plaintexts P through the output 156 for use or further processing.

Figure 3:
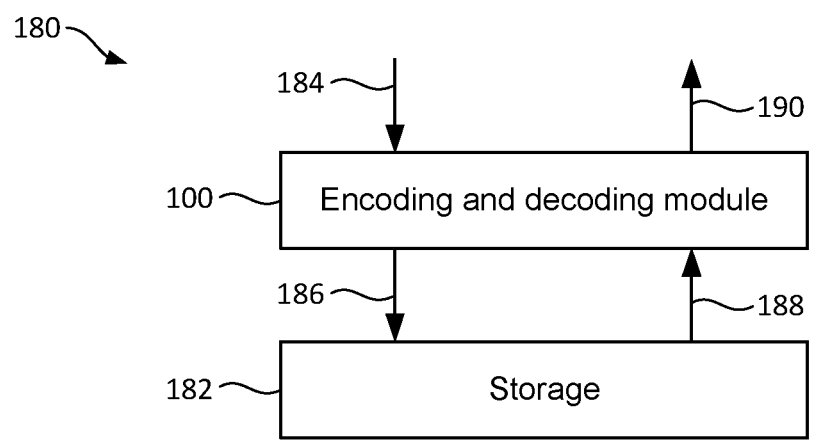
FIG. 3 is a simplified schematic diagram of a secure storage device comprising a storage module functionally coupled to an encoding and decoding module having the structure shown in FIG. 1, according to some embodiments of this disclosure.

As another example, FIG. 3 shows a secure storage device 180 comprising a storage component 182 functionally coupled to an encoding and decoding module 100. The storage component 182 may be volatile and/or non-volatile, non-removable or removable memory such as RAM, ROM, EEPROM, solid-state memory, hard disks, writable and/or rewritable CD, writable and/or rewritable DVD, flash memory, or the like.

When storing data to the secure storage device 180, the encoding and decoding module 100 receives data 184 to be written to the storage component 182, encrypts the received data 184 with authentication and error-correction as described above, and writes the encrypted data 186 to the storage component 182. When reading data from the secure storage device 180, the encoding and decoding module 100 reads encrypted data 188 from the storage component 182, verifies the integrity of the ciphertexts C and the optional other data such as the AAD A, corrects errors therein (if errors can be corrected), and decrypts the encrypted data 188, and outputs the decrypted data 190.

As shown in above examples, a secure system or device generally comprises an encryption side having an authentication encoder for encrypting plaintexts P into ciphertexts C and a decryption side having a verification/error-correction decoder for decrypting ciphertexts C into plaintexts P. In some embodiments, the encryption and decryption sides may be separate devices 142 and 144, and the encoder and decoder may be separate modules. In some other embodiments, the encryption and decryption sides may be the same device 180, and the encoder and decoder maybe the same module. In yet some other embodiments, the encryption and decryption sides may be the same device 180, and the encoder and decoder maybe separate modules. For example, in some embodiments similar to FIG. 3, the encryption and decryption sides may be the same device 180, and the encoding and decoding module 100 may be substituted with an encoder 100A and a decoder 100B wherein the encoder and decoder 100A and 100B are separate modules.

Herein, the encoder/decoder 100 executes an encryption process and/or a decryption process for encrypting and/or decrypting data using authenticated encryption (AE). Therefore, the encryption process generally comprises an encryption stage for encrypting plaintexts P to ciphertexts C, and an authentication stage for generating an authentication tag for authenticating the ciphertexts C and other data such as AAD A. The encryption and authentication stages may be executed in any suitable order or in parallel for stream encoding, depending on the implementation.

Correspondingly, the decryption process generally comprises a decryption stage for decrypting ciphertexts C to plaintexts P and a verification stage for verifying the authenticity of the ciphertexts C and other data such as AAD A, wherein ciphertexts C and other data such as AAD A with failed integrity verification are rejected and those with successful integrity verification are output from the decryption process for further use (for example, providing to the user). The decryption and verification stages may be executed in any suitable order or in parallel for stream decoding, depending on the implementation.

B. ENCRYPTION AND DECRYPTION

Figure 4:
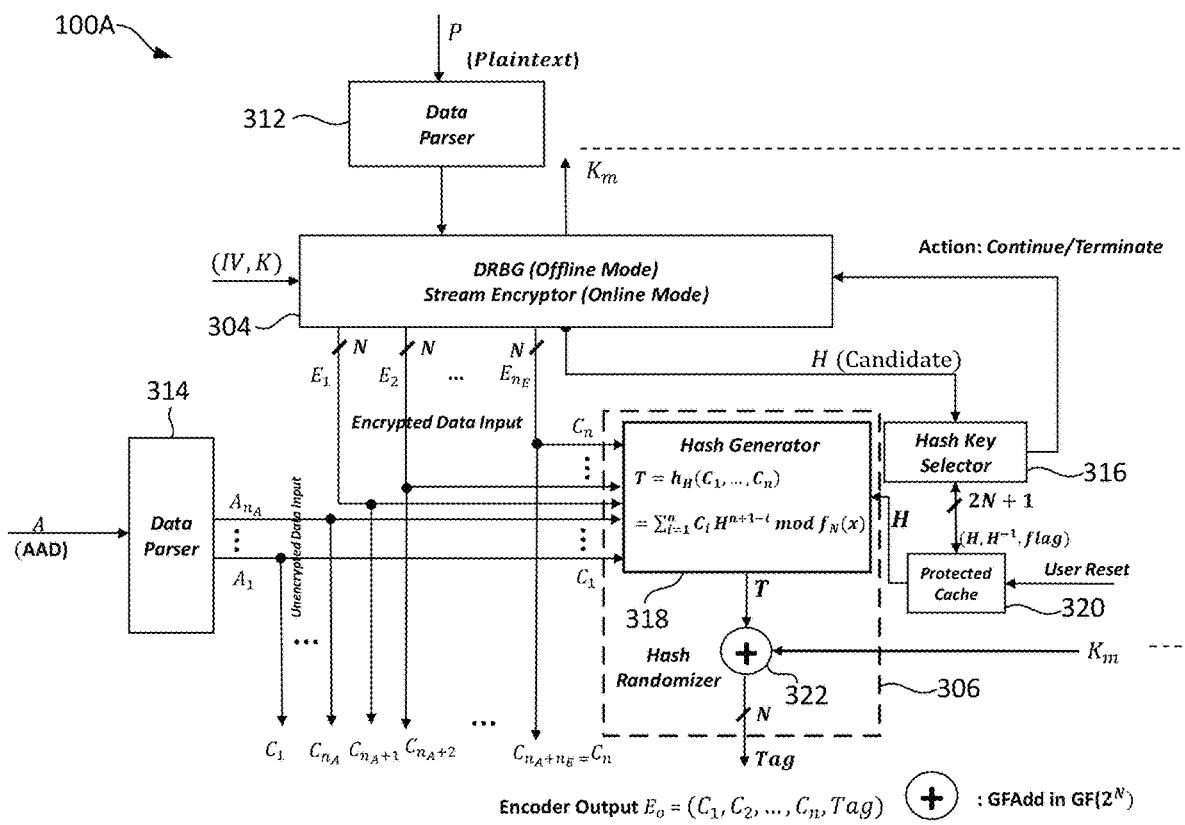
FIG. 4 is a schematic diagram showing the detailed structure of the encoder shown in FIG. 1, according to some embodiments of this disclosure.

FIG. 4 is a schematic diagram showing the encoder 100A according to some embodiments of this disclosure. The encoder 100A uses error-tolerant message-authentication code (ETMAC) to encrypt a plaintext P to a ciphertext E and output an extended ciphertext $C=(C_1, C_2, \ldots, C_n)$ and an integrity tag (also denoted a "message-authentication code (MAC) tag" and represented hereinafter using the symbol "Tag"). For ease of description, the parameters used by the encoder 100A and the description thereof are listed in Table 1 below.

TABLE 1

| \multicolumn{2}{c}{ENCODER/DECODER PARAMETERS} | |
| --- | --- |
| Parameter | Description |
| N | Plaintext/ciphertext block size, known to both the encoder 100A and the decoder 100B |
| n | Number of blocks with one single tag block, known to both the encoder 100A and the decoder 100B |
| IV | Nonce for stream encryption/decryption, known to both the encoder 100A and the decoder 100B; in some embodiments IV has 96 bits and aligned with the GCM/GMAC standard |
| K | Key for stream encryption/decryption, known to both the encoder 100A and the decoder 100B |
| Seed | N-bit seed for the deterministic random bit generator (DRBG), known to both the encoder 100A and the decoder 100B |
| $K_m$ | ETMAC key of length N |
| $N_T$ | Tag size, known to both the encoder 100A and the decoder 100B |

As shown in FIG. 4, the encoder 100A comprises an encoding submodule 304 acting as a deterministic random bit generator (DRBG) in an offline mode for generating one or more hash-key value candidates (denoted "H candidates" hereinafter) and as a stream encryptor (or simply an "encryptor") in an online mode for receiving a plaintext P, encrypting the plaintext P, and outputs a ciphertext E. For ease of description, the term "encryptor of the encoding submodule 304" refers to the encoding submodule 304 in the online mode acting as the encryptor, and the term "DRBG of the encoding submodule 304" refers to the encoding submodule 304 in the offline mode acting as the DRBG.

A hash submodule 306 uses the ciphertext E, a hash-key value H, and optionally additional authenticated data (AAD) A for generating the MAC tag Tag for integrity verification at the decoder side, or more specifically as an ETMAC for providing authenticity and reliability to the extended ciphertext C. The encoder 100A then concatenate the ciphertext E, and optionally the AAD A to form the extended ciphertext C for output with the Tag. The confidentiality of the plaintext P is provided by the stream encryptor of the encoding submodule 304, and the integrity and reliability of the ciphertext E and optionally the AAD A is provided by the ETMAC. Herein, the input plaintext P comprises or is parsed into $n_E$ plaintext data blocks (with padding if needed; described in more detail later) and the AAD A comprises or is parsed to $n_A$ AAD blocks (with padding if needed; described in more detail later). The summation of $n_E$ and $n_A$ is denoted as n (that is, $n=n_E+n_A$). The bound of n is in compliance with the standard GCM/GMAC guideline (see Reference [R11]). Moreover, $n_E$, $n_A$ and n are known to the encoder 100A and decoder 100B.

In these embodiments, the encoder 100A comprises a data parser 312 for parsing the input plaintext P into the $n_E$ plaintext data blocks for inputting to the encryptor of the encoding submodule 304 in sequential order, where each plaintext data block has a bit-size N such as N=128 bits, and $n_E \geq 0$ (wherein $n_E=0$ means that there is no plaintext to be encrypted and the encoder 100A may authenticate the AAD A only).

The encryptor of the encoding submodule 304 outputs the encrypted data (that is, the ciphertext E) which is used for forming the extended ciphertext C (described later) and for inputting to the hash submodule 306.

The input of the hash submodule 306 includes the encrypted data E output from the encryptor of the encoding submodule 304 and optionally the unencrypted AAD A, which are combined to form the extended ciphertext C having n blocks ($C_1, C_2, \ldots, C_n$) each having a bit-size N. Therefore, in these embodiments, $$\left\lceil \frac{|A| + |E|}{N} \right\rceil \leq n, \quad (1)$$

where |x| is the length of x in bits, and $\lceil x \rceil$ represents the smallest integer greater than or equal to x. Those skilled in the art will appreciate that, in various embodiments, the lengths of the unencrypted AAD A and the encrypted data E may be predefined or determined by the user, and the number of blocks of AAD and that of ciphertext may be any non-negative numbers that meet the requirement of Equation (1).

More specifically, the encrypted data E is in the form of $n_E$ encrypted data blocks $E_1, \ldots, E_{n_E}$ sequentially output from the encryptor of the encoding submodule 304, wherein each encrypted data block has a bit-size N and $$n_E = \left\lceil \frac{|E|}{N} \right\rceil.$$

Thus, when the size of the ciphertext E is not an integer multiple of N, the last encrypted data block $E_{n_E}$ may be padded by a binary string $10^{N \times n_E - |E| - 1}$ (that is, a binary one (1) with ($N \times n_E - |E| - 1$) binary zeros (0's)) to ensure that its bit-size is N.

The AAD A is a piece of data provided by a user, which may be, for example, port numbers, IP address numbers, memory addresses, and/or the like. The AAD A is generally a clear text (unencrypted and with no confidentiality) and only the data authenticity and reliability of the AAD A is protected. The AAD A is input from the user in plaintext (after applying message parsing). In some embodiments, the length of AAD A may be a multiple of eight (8) bits such that it can be presented by a byte string.

A parser 314 may be used to parse the AAD A into $n_A$ AAD blocks $A_1, A_2, \ldots, A_{n_A}$, wherein each AAD block has a bit-size N and $$n_A = \left\lceil \frac{|A|}{N} \right\rceil.$$

Thus, when the size of the AAD A is not an integer multiple of N, the last AAD block may be padded by a binary string $10^{N \times n_A - |A| - 1}$ to ensure that its bit-size is N.

The encrypted data blocks $E_1, \ldots, E_{n_E}$ and the AAD blocks $A_1, \ldots, A_{n_A}$ are combined to form the extended ciphertext C (having n combined blocks) for inputting to the hash submodule 306, wherein each combined block has a bit size N and is either an AAD block or an encrypted data block. More specifically, the i-th block $C_i$ of the extended ciphertext C is:

$$C_i = \begin{cases} A_i & : \text{for } i = 1, \ldots, n_A \\ E_{i-n_A} & : \text{for } i = n_A + 1, \ldots, n_A + n_E \end{cases}. \quad (2)$$

Hence, the total number of the combined blocks of the extended ciphertext C input into the hash submodule 306 is $n=n_A+n_E$. The hash submodule 306 uses the extended ciphertext C and the hash-key value H to generate the Tag (that is, the Tag is generated once the entire input data of the extended ciphertext C is provided to the hash submodule 306 by the encryptor of the encoding submodule 304 and (optionally) the user). The size $N_T$ of the Tag is $N_T=N$. As shown in FIG. 4, the extended ciphertext C is combined with the Tag to form the encoder output $E_O$ for outputting from the encoder 100A:

$$E_O=(C_1,C_2,\ldots,C_n,\text{Tag}). \quad (3)$$

The details of the encoder 100A and the workflow 330 thereof are now described with reference to FIGS. 4 and 5.

In some embodiments, the encoding submodule 304 comprises a single hardware submodule that may operate as a DRBG in an offline mode and as a stream encryptor in an online mode. In other words, the encoding submodule 304 comprises a first circuit for operating as the DRBG in the offline mode and a second circuit for operating as the stream encryptor in the online mode, and at least a major portion of the first circuit is the same as a major portion of the second circuit.

In some embodiments, the encoder 100A comprises a stream encryptor as the encoding submodule. The stream encryptor is configured for acting as the DRBG in the offline mode for generating one or more hash-key value candidates, and is configured for encrypting the plaintext into the ciphertext in the online mode.

For example, the architecture or circuit of the encoder 100A may comply with the Galois counter mode/Galois message authentication code (GCM/GMAC) encryptor described in Reference [R1]. As those skilled in the art will appreciate, the GCM/GMAC encryptor comprises an Advanced Encryption Standard (AES)-counter mode (AES-CTR) encryption function and a GHASH function. In these embodiments, the AES-CTR encryption function is used in the encoding submodule 304 as the stream encryptor (in the online mode receiving the plaintext as input and encrypting the plaintext into the ciphertext) and as the DRBG (in the offline mode receiving the stream encryption key K and the nonce IV and generating the hash-key value candidates H; see FIGS. 4 and 8 and Table 2), and the GHASH function is used for the hash submodule 306 for generating the tag for authentication. As those skilled in the art will appreciate, not all hash-key value candidates H generated by the DRBG may be valid and have the error-correction capability. Therefore, each hash-key value candidate H generated by the DRBG is tested by the hash key selector 316 to check whether it can correct errors.

Figure 5:
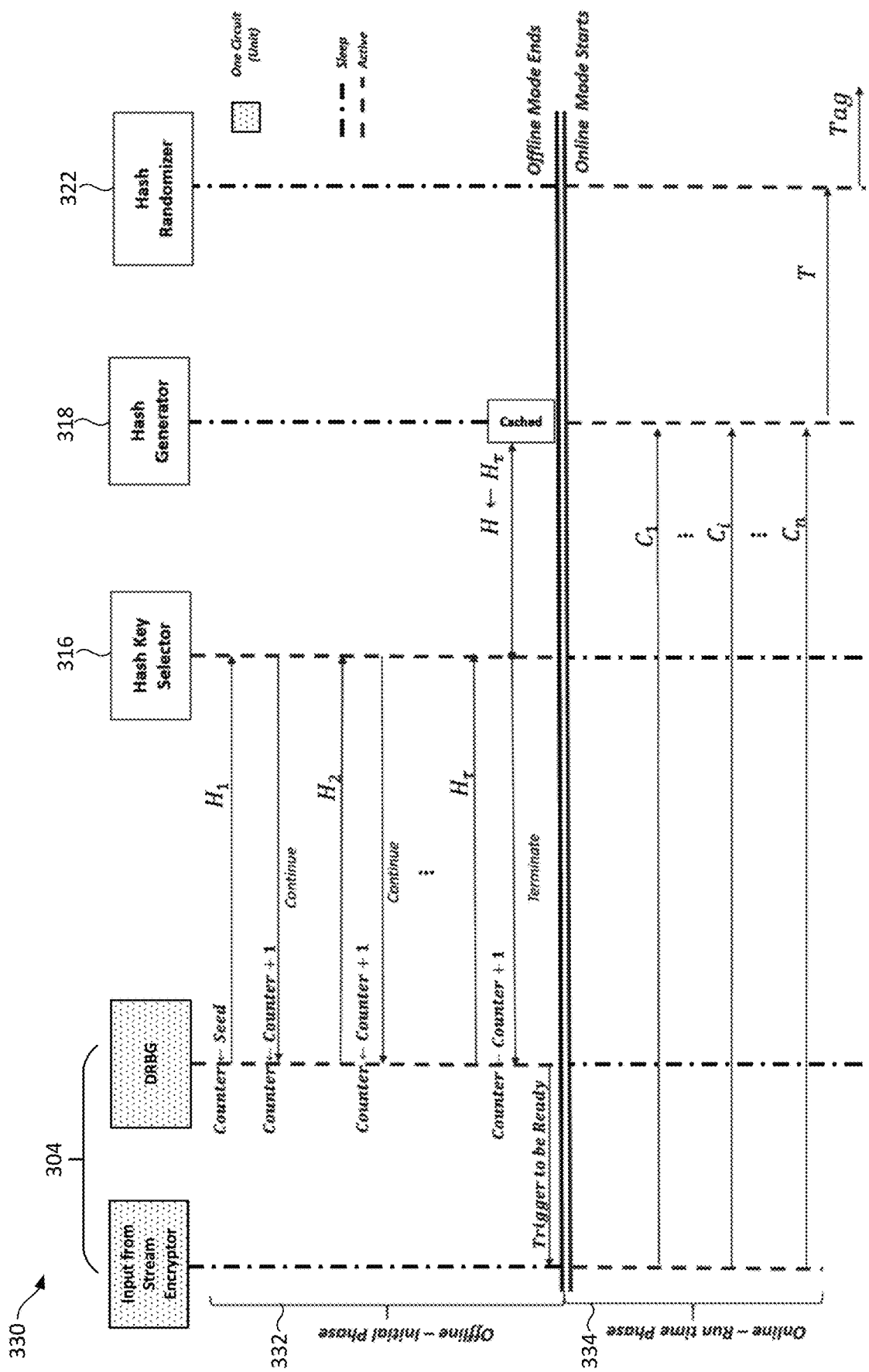
FIG. 5 shows the workflow of the encoder shown in FIG. 4.
Figure 8:
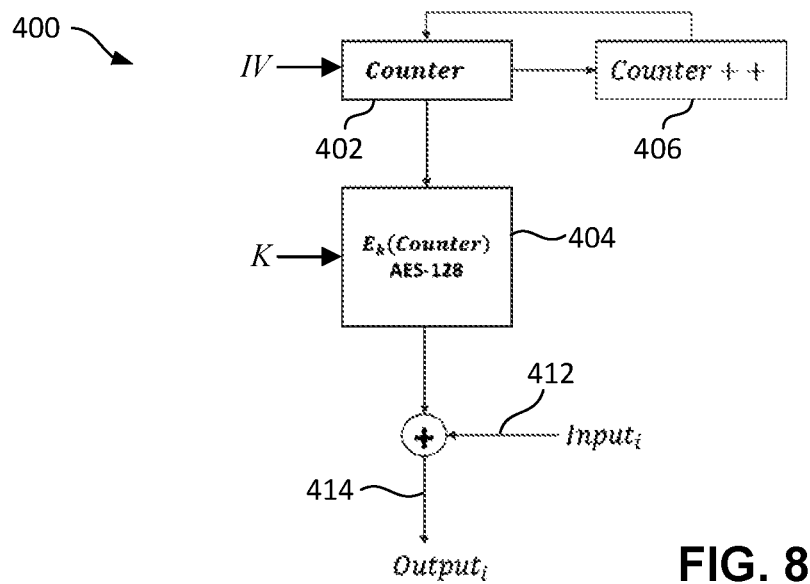
FIG. 8 is a schematic diagram showing the encoding and decoding submodules shown in FIGS. 4 and 6, respectively, acting as a 128-bit Advanced Encryption Standard (AES-128) based counter-mode deterministic random bit generator (DRBG) in an offline mode.

The encoding submodule 304 operates in the offline mode at the initial phase of the encoder 100A, such as during the setup time of the encoder 100A (wherein the encoder 100A is also considered in the offline mode 332 in FIG. 5) before the system or device that uses the encoder 100A starts to send the extended ciphertext and the associated tag. During this phase, no data is accepted by the encoder 100A (described in more detail later), that is, the plaintext P=0 and the AAD A=0. The circuit of the encoding submodule 304 receives an N-bit seed (that is, the Seed in Table 1) and functions as the DRBG to generate a plurality of pseudo-random blocks as a plurality of H candidates of the hash-key value H to be selected. Each H candidate is an N-bit value. In these embodiments, the seed is counter initially having the value of the nonce IV, and each generated H candidate depends on both the stream encryption key K and the current seed. Thus, each H candidate is generated by encrypting the current seed using the stream encryption key K and XOR-ing the output with zero (0) as shown in FIG. 8 and Table 2 below.

In these embodiments, when an H candidate is generated, the DRBG of the encoding submodule 304 sends the generated H candidate to a hash key selector 316. The hash key selector 316 then runs a test (such as the hash test described in Reference [R3]) on each H candidate and determines, based on the test result, if or not it is acceptable as the hash-key value H for the hash submodule 306.

If the H candidate being tested is not acceptable as the hash-key value H, the hash key selector 316 sends an "Action: Continue" signal (such as a bit of one (1)) to the DRBG of the encoding submodule 304 to instruct the DRBG of the encoding submodule 304 to generate another H candidate, and sends a "null" to a hash generator 318 of the hash submodule 306.

If the H candidate being tested is acceptable as the hash-key value H, the hash key selector 316 sends an "Action: Terminate" signal (such as a bit of zero (0)) to the DRBG of the encoding submodule 304 to instruct the DRBG of the encoding submodule 304 to stop generating any new H candidate (that is, the task of the encoding submodule 304 as the DRBG is completed), and sends the H candidate as the selected hash-key value H to the hash generator 318 of the hash submodule 306.

As those skilled in the art will appreciate, the integrity of the system is collapsed if the selected hash-key value H is compromised (see Reference [R3]). Therefore, in these embodiments, a protected cache 320 is used to confidentially store the selected hash-key value H and $H^{-1}$ (which is the inverse of H in the Galois Field $GF(2^N)$) for future use. The protected cache 320 uses a one-bit flag to indicate the validity of the value stored therein. For example, flag=1 indicates a valid hash key H and flag=0 indicates a non-valid hash key H. The user may reset the protected cache 320. At the start of the offline mode 332 or when the user resets the protected cache 320, the flag is set to zero (0). When the selected hash-key value H is stored in the protected cache 320, the flag thereof is set to one (1). Moreover, when the flag becomes zero (0) (for example, by the user reset or internal refreshment request), the protected cache 320 sends a request to the hash key selector 316 to trigger the hash key selector 316 to send the "Action: Continue" signal to the encoding submodule 304 (which may currently operate as the stream encryptor) to interrupt it to return back to the DRBG mode (that is, to operate as the DRBG).

Referring back to the encoding submodule 304 in FIG. 4, the offline mode is completed and the encoding submodule 304 enters the online mode (also denoted the "run-time mode") once the hash-key value H is selected. The encoder 100A also enters the online mode 334 (see FIG. 5) and starts to accept data inputs (the plaintext P and the AAD A) for encryption and Tag generation. In this mode, the encryptor 304 works the same as GCM/GMAC tag generator described in Reference [R11]. As those skilled in the art understand, the GHASH submodule of GCM/GMAC uses an additional input block (constructed from the lengths of the AAD and ciphertext) for computing the tag. In some embodiments, the tag generation of the encoder disclosed herein does not use such an additional input block as these lengths are fixed and agreed between the encoder and decoder in advance.

In the online mode 334, the encoding submodule 304 operates as a stream encryptor for encrypting the plaintext P using a stream encryption key K and the IV, and generating a key $K_m$ (denoted an ETMAC key hereinafter) of a length of N bits based on the nonce IV for hash randomization (one-time pad; described in more detail later) for the confidentiality of the hash computations (specifically the hash-key value H to be used by the hash generator 318 for generating the Tag). In some embodiments, the ETMAC key $K_m$ is calculated by the stream encryption in the same way that is generated in GCM/GMAC (see Reference [R1]), that is, encrypting a vector formed by the nonce IV appending or concatenating 31 bit-zeros (0's) and a bit-one (1), that is, $K_m = Enc_K(IV\|0^{31}\|1)$, wherein $Enc_K(x)$ represents encrypting the input x using the stream encryption key K, and the ETMAC key $K_m$ may be changed randomly per Tag by updating the nonce IV (for example, incrementing the IV by one (1) to have different value for each use).

In some embodiments, the implementation of the hash generator 318 may comply with the GCM/GMAC (see Reference [R1]). The hash generator 318 receives the hash-key value H from the hash key selector 316 (or the protected cache 320 if it is used). If the received value is not "null" (or the flag of the protected cache 320 is not zero (0)), the hash generator 318 then calculates a polynomial $$h_x(C_1, \ldots, C_n) = \sum_{i=1}^{n} C_i x^{n+1-i} \bmod f_N(x) \quad (4)$$

at point x=H as the universal hash function (see Reference [R9]), where the calculation is completed in Galois Field GF($2^N$) constructed by an irreducible polynomial $f_N(x)$ with degree N. The calculated result $h_H(C_1, \ldots, C_n)$ is used as the hash output T of the hash generator 318, that is:

$$T = h_H(C_1, \ldots, C_n) = \sum_{i=1}^{n} C_i H^{n+1-i} \bmod f_N(x). \quad (5)$$

In the hash submodule 306, the hash output T of the hash generator 318 is sent to a hash randomizer 322 which uses the ETMAC key $K_m$ generated by the encoding submodule 304 as a randomized mask on the hash output T to generate the confidential Tag. More specifically, the hash randomizer 322 performs an addition of $K_m$ and T in Galois Field GF($2^N$), which is equivalent to an N-bit XOR.

Figure 6:
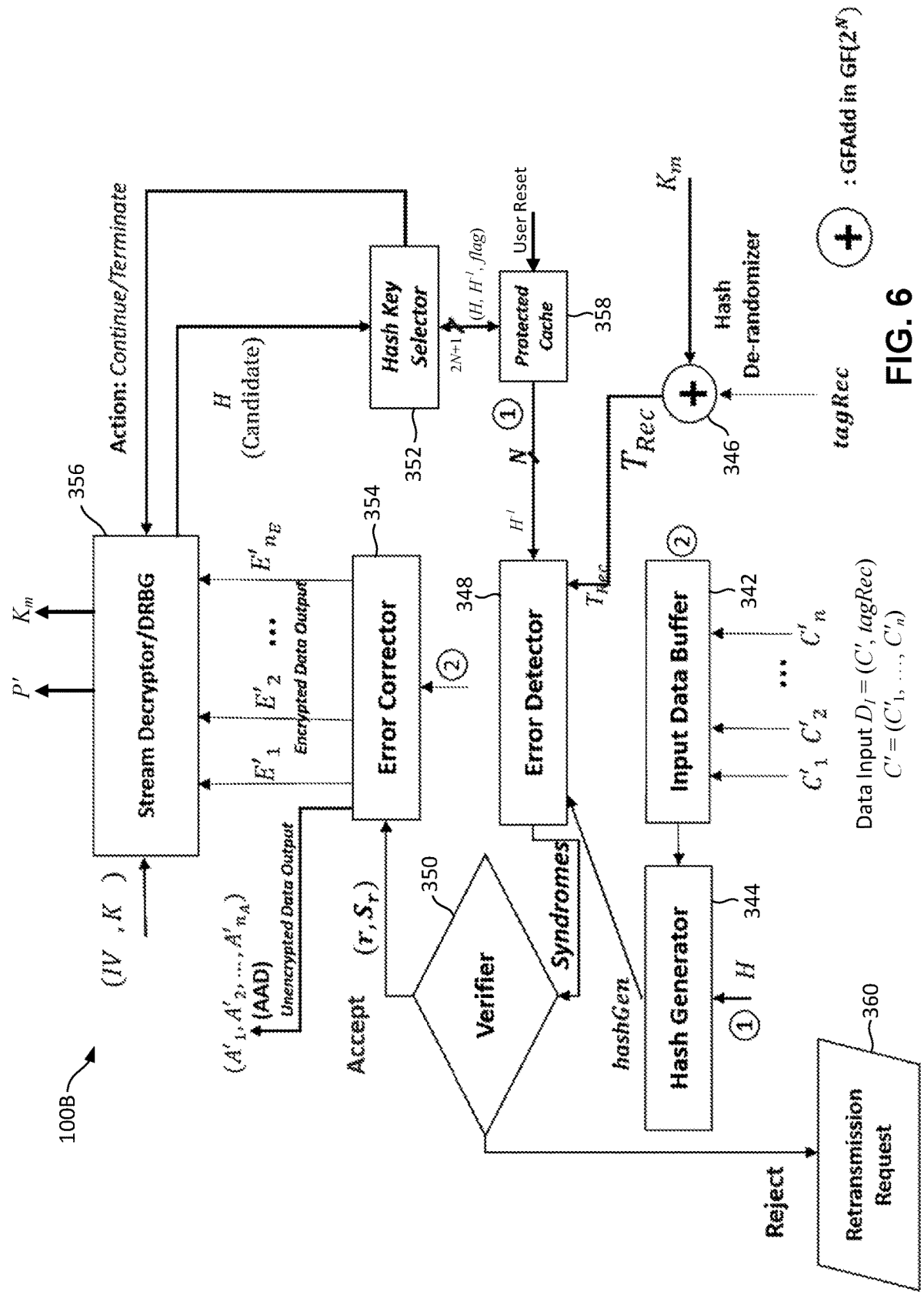
FIG. 6 is a schematic diagram showing the detailed structure of the decoder shown in FIG. 1, according to some embodiments of this disclosure.
Figure 7:
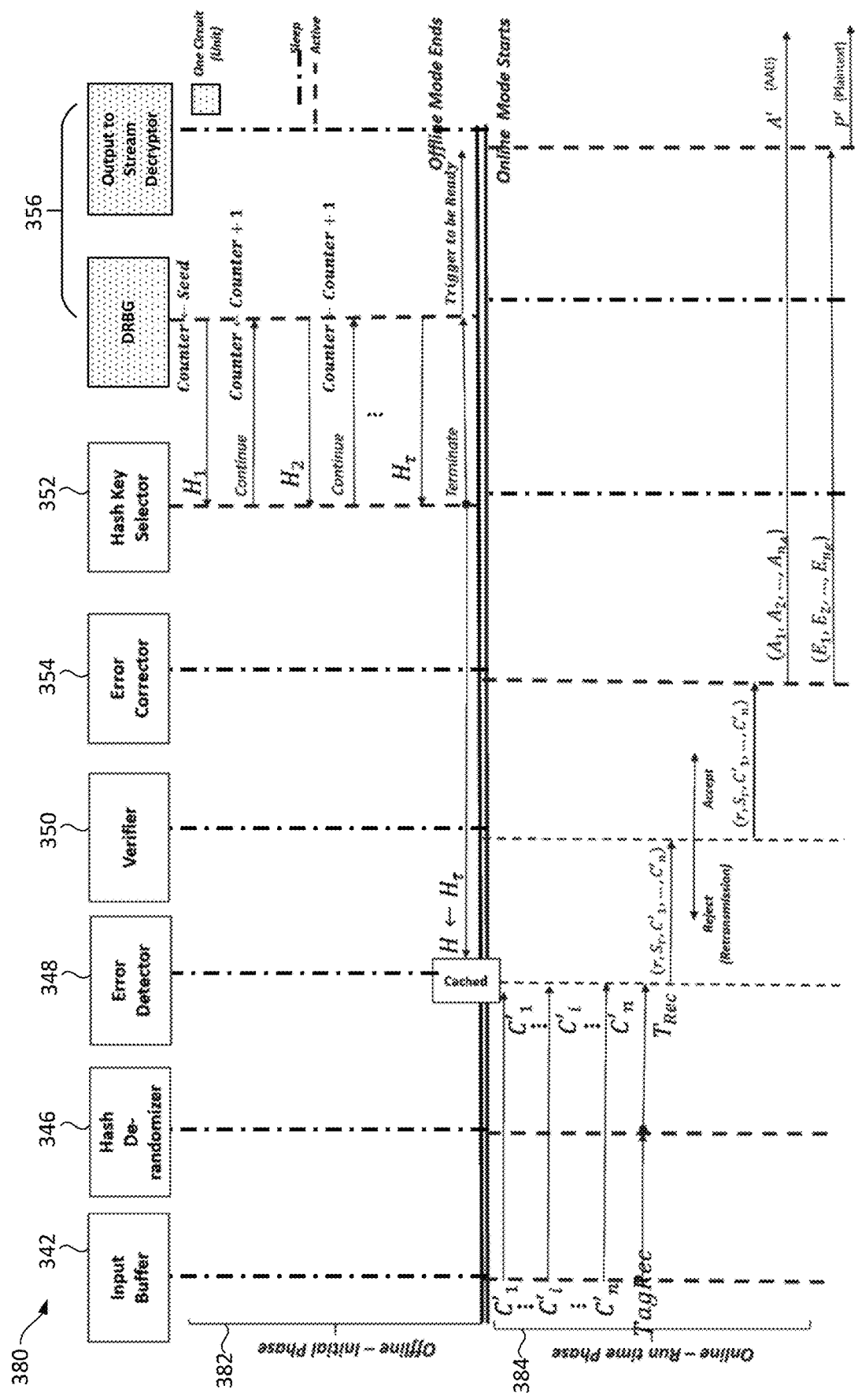
FIG. 7 shows the workflow of the decoder shown in FIG. 6.

FIG. 6 is a schematic diagram showing a decoder 100B according to some embodiments of this disclosure, wherein the two marks ① (numeral one (1) in a circle) are connected and the two marks ② (numeral two (2) in a circle) are connected, which are not shown in FIG. 6 for ease of illustration. FIG. 7 shows the workflow 380 of the decoder 100B.

As shown in FIGS. 6 and 7, the decoder 100B receives data input $D_f$=(C', tagRec), wherein C'=($C_1'$, ... $C_n'$) is a received extended-ciphertext and tagRec is a received tag. In various embodiments, the received extended ciphertext C' and tagRec may be an extended ciphertext C and a Tag, respectively, generated by an encoder 100A on a transmitter side and transmitted from the transmitter to the receiver having the decoder 100B (see FIG. 2), or may be an extended ciphertext C and a Tag, respectively, generated by an encoder 100A and stored in a storage 182 (see FIG. 3). The decoder 100B may correct errors in the received extended-ciphertext C' and obtain a decrypted plaintext P', or if the errors cannot be corrected, reject the received extended-ciphertext C' (and may request retransmission or re-reading from the storage).

The decoder 100B comprises an input data buffer 342, a hash generator 344, a hash de-randomizer 346, an error detector 348, a verifier 350, a hash key selector 352, an error corrector 354, and a decoding submodule 356. In some embodiments, the decoder 100B may also comprise a protected cache 358.

Similar to the encoding submodule 304 of the encoder 100A, the decoding submodule 356 in some embodiments may be a combination of a DRBG and a stream decryptor. For example, the decoding submodule 356 may comprise a single hardware submodule that may operate as a DRBG in an offline mode (such as during the setup time of the decoder 100B) and as a stream decryptor in an online mode. In other words, the decoding submodule 356 comprises a first circuit for operating as the DRBG in the offline mode and a second circuit for operating as the stream decryptor in the online mode, and at least a major portion of the first circuit is the same as a major portion of the second circuit.

In some embodiments, the architecture or circuit of the decoder 100B may comply with the GCM/GMAC decryptor described in Reference [R1] and comprise additional components such as the error detector 348, the error corrector 354, and the hash key selector 352 that are not part of GCM/GMAC. Moreover, unlike the GCM/GMAC decryptor, the decoder 100B checks the integrity, corrects errors in the received data, and (if errors are correctable) then decrypts the received data.

In some embodiments, the decoder comprises a stream decryptor as the decoding submodule. The stream decryptor is configured for acting as the DRBG in the offline mode for generating one or more hash-key value candidates, and is configured for decrypting the ciphertext into the plaintext in the online mode.

Similar to the encoding submodule 304 of the encoder 100A, the decoding submodule 356 operates in the offline mode 382 at the initial phase of the decoder 100B, such as during the setup time of the decoder 100B (wherein the decoder 100B is also considered in the offline mode 382 in FIG. 7) before the system or device that uses the decoder 100B starts to receive or read the data input $D_f$. During this phase, no data is accepted by the decoder 100B, that is, C'=0 and tagRec=0. The circuit of the decoding submodule 356 receives an N-bit Seed (see Table 1; generated from the nonce IV in a similar manner as described above) and functions as a DRBG (similar to or same as the DRBG of the encoder 100A) to generate a plurality of pseudo-random blocks as a plurality of candidates (that is, the H candidates) for selecting a hash-key value H therefrom. Each H candidate is an N-bit value.

In these embodiments, when an H candidate is generated, the DRBG of the decoding submodule 356 sends the generated H candidate to the hash key selector 352 which is similar to or same as the hash key selector 316 of the encoder 100A. The hash key selector 352 then runs a test (such as the hash test described in Reference [R3]) on each H candidate and determines, based on the test result, if or not it is acceptable as the hash-key value H for the hash generator 344 and the error detector 348.

If the H candidate being tested is not acceptable as the hash-key value H, the hash key selector 352 sends an "Action: Continue" signal (such as a bit of one (1)) to the DRBG of the decoding submodule 356 to instruct the DRBG of the decoding submodule 356 to generate another H candidate.

If the H candidate being tested is acceptable as the hash-key value H, the hash key selector 352 sends an "Action: Terminate" signal (such as a bit of zero (0)) to the DRBG of the decoding submodule 356 to instruct the DRBG of the decoding submodule 356 to stop generating any new H candidate (that is, the task of the decoding submodule 356 as the DRBG is completed), and sends the H candidate as the selected hash-key value H to the hash generator 344 and the error detector 348.

In some embodiments, the hash key selector 352 of the decoder 100B is the same as the hash key selector 316 of the encoder 100A, and the encoder and decoder 100A and 100B are in the same device. In these embodiments, the encoder and decoder 100A and 100B may share a single hash key selector generally with no performance loss (because the hash key selector is used by the encoder and decoder 100A and 100B only at their offline modes (that is, their initial phases)).

Similar to the encoder 100A, the decoder 100B may comprise a protected cache 358 (similar to the protected cache 320 of the encoder) to confidentially store the selected hash-key value H and $H^{-1}$ for future use. The protected cache 358 uses a one-bit flag to indicate the validity of the value stored therein.

Referring back to the decoding submodule 356 in FIG. 6, the offline mode of the decoding submodule 356 is completed and the decoding submodule 356 enters the online mode (also denoted the "run-time mode") and operates as a stream decryptor once the hash-key value H is selected. Correspondingly, the decoder 100B also enters the online mode 384 (see FIG. 7) and starts to accept the data input $D_I$ for integrity verification, error correction, and decryption.

More specifically, the received data input $D_I$ comprises an extended-ciphertext $C'=(C_1', \ldots C_n')$ comprising a set of received combined-blocks $C_1', \ldots C_n'$ with each block $C_i'$ (i=1, . . . , n) has a size of N bits, and a received tag tagRec also having a size of N bits. In the online mode, the blocks $C_i'$ of the extended-ciphertext C' are sequentially sent to the input data buffer 342 and cached therein until the received tag tagRec is arrived and de-randomized (described in more detailed later). Then, the received extended-ciphertext C' is sent from the input data buffer 342 to the error detector 348. The blocks of the extended ciphertext C' are also sequentially sent from the input data buffer 342 to the hash generator 344, upon their arrival one by one, to compute a hashGen.

The received tag tagRec is sent to the hash de-randomizer 346. Similar to the hash randomizer 322 of the encoder 100A, the hash de-randomizer 346 of the decoder 100B de-randomizes the received tag tagRec into a $T_{Rec}$ using an ETMAC key $K_m$ of a length of N bits generated by the decoding submodule 356 based on the nonce IV, and sends the derived $T_{Rec}$ to the error detector 348. In these embodiments, the generation of the key $K_m$ by the decoding submodule 356 is the same as the generation of the ETMAC key $K_m$ by the encoding submodule 304.

As described above, the selected hash-key value H is sent to the hash generator 344 and the error detector 348. In these embodiments, the hash generator 344 is the same as the hash generator 318 of the encoder 100A. The hash generator 344 receives the selected hash-key value H from the hash key selector 352 (or the protected cache 358 if the protected cache 358 is used). If the selected hash-key value H is not "null" (or the cache flag of the protected cache 358 is not zero (0)), then, the hash generator 344 calculates a polynomial $$f_X(C_1', \ldots C_i') = \sum_{i=1}^{n} C_i' x^{n+1-i} \mod f_N(x) \quad (6)$$

at point x=H as the universal hash function (see Reference [R9]), where the calculations is completed in Galois Field $GF(2^N)$ constructed by an irreducible polynomial $f_N(x)$ with degree N. The calculated result $f_H(C_1', \ldots C_n')$ is used as the output hashGen of the hash generator 344, that is:

$$\text{hashGen} = f_H(C_1', \ldots, C_n'). \quad (7)$$

The output hashGen of the hash generator 344 is sent to the error detector 348.

With the inputs $(C_1', \ldots C_n', H, T_{Rec}, \text{hashGen})$, the error detector 348 calculates and outputs a vector of n+1 syndromes, with n syndromes each corresponding to an entry of the received extended-ciphertext $C'=(C_1', \ldots C_n')$ and an additional syndrome corresponding to the tagRec, and may specify the error bits and the corresponding error bias thereof under certain conditions (for example, only one block of the n+1 blocks (including n extended-ciphertext blocks and one tagRec block) has errors and the errors are less than or equal a threshold used in the test of the hash value candidates).

The syndromes are sent to the verifier 350 which assesses the syndromes to verify if the errors are correctable or not. If the errors are fully correctable, the original plaintext P may be recovered (thus the data integrity is maintained), and the pair $(r, S_r)$ is sent to the error corrector 354, where r indicates the block error location (that is, $C_r'$ is erroneous) and $S_r$ indicates one or more error bias (that is, $S_r$ is an N-bit vector containing one or more biased bits (for example, one or more bit-ones (1's) indicating erroneous bits in $C_r'$ at the corresponding bit locations) and zero or more unbiased bits (for example, zero or more bit-zeros (0's) indicating correct bits in $C_r'$ at the corresponding bit locations)). If the errors are not fully correctable, the verifier 350 triggers a retransmission request 360 and rejects the received extended ciphertext C'.

The error corrector 354 receives the received extended-ciphertext C' from the input data buffer 342 and receives the pair $(r, S_r)$ from the verifier 350. The error corrector 354 uses the pair $(r, S_r)$ to correct the errors (if any) in the received extended-ciphertext C' (the error-corrected extended-ciphertext (if error correction occurred) also denoted by symbol C' for simplicity) and outputs the unencrypted $(C_1', \ldots C_{n_A}')$ as the recovered AAD A', that is, $A'=(A_1', \ldots A_{n_A}')=(C_1', \ldots C_{n_A}')$, and outputs the rest of the received combined-blocks to the stream decryptor of the decoding submodule 356 as the recovered ciphertext, that is, $(E_1', \ldots E_{n_E}')=(C_{n_A+1}', \ldots C_n')$. The stream decryptor of the decoding submodule 356 then decrypts the recovered ciphertext and outputs the plaintext P'.

In Message Authentication, Galois Integrity and Correction (MAGIC) (see Reference [R3]), it is an open problem that how the encoder and decoder should agree on the same hash-key value H. On the other hand, any new key agreement design requires exclusive key agreement protocols between the encoder and decoder. Indeed, it requires extra hardware complexity for the design of a new circuit to handle this agreement.

In the embodiments disclosed herein, the hash key agreement is done before the tag generation at the encoder 100A and the verification at the decoder 100B are running. Hence, the corresponding circuits of the encoder and decoder 100A and 100B are not operating for their primary functions (that is, encrypting and decrypting) during the selection of the hash-key value H. On the other hand, the encryptor/decryptor of GCM/GMAC (see Reference [R1]), which is based on 128-bit Advanced Encryption Standard (AES-128) counter mode with nonce, is a suitable candidate for the encoding and decoding submodules 304 and 356 (when they act as the stream encryptor/decryptor) in some embodiments for three reasons: (1) They are very fast and running on stream data; (2) The circuit of the stream encryptor/decryptor of GCM/GMAC is the same; (3) The structure thereof is in compliance with DRBG NIST Special Publication 800-90A Revision 1 Section 10.2 (see Reference [R12]).

As shown in FIG. 8, in above embodiments, the circuits of the encoding and decoding submodules 304 and 356 are operating during the offline mode 332/382 as an AES-128 based counter-mode DRBG 400 (see Section 10.2 in Reference [R12]). To do this, the counter 402 is first seeded by the IV (from the user) while the plaintext input (Input) 412 is set to zero (0). The output of the counter 402 is sent to an AES-128 encryptor 404 to encrypt the counter using the stream encryption key K to obtain the i-th DRBG output (which is a pseudo-random number to be used as the i-th hash-key value candidate, i=1, 2, ... ). Then, the counter 402 is increased by one (denoted by the incremental block (Counter++) 406) for generating the next hash-key value candidate.

As both the encoder and the decoder 100A and 100B uses the same seed, the output sequences 414 of the encoder and the decoder 100A and 100B are the same. This sequence 414 is used at both encoder and the decoder 100A and 100B to provide the hash key selector 316/352 with a sequence of randomly chosen candidates (that is, the H candidates) from space $GF(2^{128})$. The unit 400 keeps generating pseudo-random sequences 414 when it receives an "Action: Continue" signal from the hash key selector 316/352. Once the hash key selector 316/352 finds an appropriate hash-key value H based on its internal deterministic test, the hash key selector 316/352 sends out an "Action: Terminate" signal to inform the DRBG 400 to stop generating the sequence 414. Then, the same circuits (that is, the circuits of the encoding and decoding submodules 304 and 356 acting as the DRBG 400) starts to operate as the stream encryptor/decryptor based on the new IV (see TABLE 2 below) and the stream encryption/decryption key K. As the selection of the hash-key value H is based on a deterministic test (see Reference [R3] for more details) per given H candidate, both the encoder and decoder 100A and 100B will eventually find the same H value when they are using the same nonce IV and the same stream encryption/decryption key K.

TABLE 2

DRBG SEQUENCE

| | ENCODEROFFLINE MODE | | | | ENCODER RUNTIME MODE | | | |
|---|---|---|---|---|---|---|---|---|
| index i | 1 | 2 | — | τ | $\tau_o = \tau + 1$ | $\tau_o + 1$ | $\tau_o + 2$ | — | $\tau_o + n$ |
| Counter | IV | IV + 1 | IV++ | IV + τ | $IV_e^{new}$ | $IV_e^{new} + 1$ | $IV_e^{new} + 2$ | — | $IV_e^{new} + n$ |
| Input | 0 | 0 | 0 | 0 | 0 | $P_1$ | $P_2$ | — | $P_n$ |
| Output | $H_1$ | $H_2$ | — | $H_\tau$ | $K_m$ | $C_1$ | $C_2$ | — | $C_n$ |

Hash Key Candidates → MAC Key ← Ciphertext

The encoder and decoder 100A and 100B in above embodiments provide the following technical advantages:

- No need for in band or out of band communication between the encoder 100A and the decoder 100B for the hash key agreement;
- No added hardware complexity (such as gate equivalent (GE) overhead) to the circuit as the existing stream encoder/decoder acts as the DRBG in the offline mode (that is, before encryption or decryption starts); and
- The encoding and decoding submodules 304 and 356 comply with the DRBG Standard NIST Special Publication 800-90A Revision 1 Section 10.2.

Figure 9A:
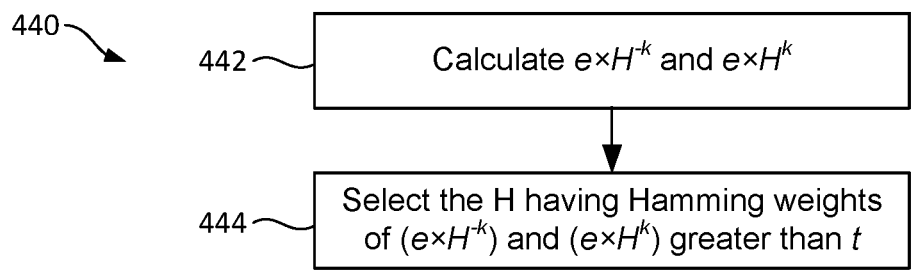
FIG. 9A is a flowchart showing a fast hash-key value selection process executed by a hash key selector of the encoder and decoder shown in FIGS. 4 and 6, respectively, according to some embodiments of this disclosure.

In some embodiments, the hash key selectors 316 and 352 of the encoder and decoder 100A and 100B use a fast hash-key value selection method or process 440 as shown in FIG. 9A for the hash key selector 316/352 to select the hash-key value H according to the definition (1) described in Page 8 of Reference [R3]:

Definition 1: The set $\mathcal{H} \subseteq \{0,1\}^N$ from which the hash keys values H of MAGIC are drawn is defined by:

$$\mathcal{H} = \{H \in \{0,1\}^N, (\forall e: e \neq 0, HW(e) \leq T_{th}) \wedge (\forall i \in [1, n-1]): HW(e \cdot H^{-1}) > T_{th}, HW(e \cdot H^i) > T_{th}\} \quad (8)$$

where $T_{th} \in [1, N]$ is the Hamming weight threshold value passed as input to procedure Verify( ).

In above definition, $\mathcal{H}$ represents the set of hash-key values H, and HW(s) represents the Hamming weight function for calculating the Hamming weight of a string s, wherein the Hamming weight of the string s is the number of symbols that are different from the zero-symbol of the alphabet used. In other words, the Hamming weight of the string s is the Hamming distance between the string s and the all-zero string of the same length (for example, HW(0110)=2). Here, the procedure Verify( ) is a verification procedure shown on Page 7 of Reference [R3] which returns not only an accept/reject boolean but also two strings. When no error correction takes place, these strings are empty. When error correction takes place, the returned strings are equal to the corrected values of the ciphertext and tag respectively.

Unlike MAGIC, the fast hash-key value selection process shown in FIG. 9A does not use any direct multiplication.

In the following, symbol $H_{select}$ represents the selected hash-key value and symbol H represents a hash-key value candidate for ease of presentation.

The hash-key value candidate H to be selected as $H_{select}$ may correct up to t errors. Herein, the error-threshold t may be determined based on the Corollary 1 in Reference [R3]:

Corollary 1: The cardinality of the set of hash keys $\mathcal{H}$ satifies:

$$|\mathcal{H}| \geq 2^N - \frac{n(n-1)}{2} \cdot \left( \sum_{t=1}^{T_{th}} \binom{N}{t} \right)^2$$

where $T_{th}$ in Corollary 1 corresponds to the error-threshold t herein.

The hash-key value candidate H suitable for being selected as $H_{select}$ for correcting up to t errors satisfies the following:

For all errors e (wherein e is an error vector of N bits, in which each non-zero bit represents an error) not equal to zero and having a Hamming weight less than or equal to a threshold t (representing the maximum number of errors that can be corrected in one block), the Hamming weights (HWs) of $(e \times H^{-k})$ and $(e \times H^k)$ for all $1 \leq k < n$ are greater than t, that is $HW(e \times H^{-k}) > t$ and $HW(e \times H^k) > t$, where $H^{-k}$ is the inverse of $H^k$ in the Galois Field $GF(2^N)$, for all k where $1 \leq k \leq n-1$.

Thus, the fast hash-key value selection process 440 first calculates $(e \times H^{-k})$ and $(e \times H^k)$ for all errors e not equal to zero and having a Hamming weight (HW) less than or equal to t (step 442), and then select the hash-key value H with the HWs of (e×H$^{-k}$) and (e×H$^k$) greater than t as the hash-key value H used by the hash generator 318 of the encoder 100A and the hash generator 344 and error detector 348 of the decoder 100B (step 444).

Figure 9B:
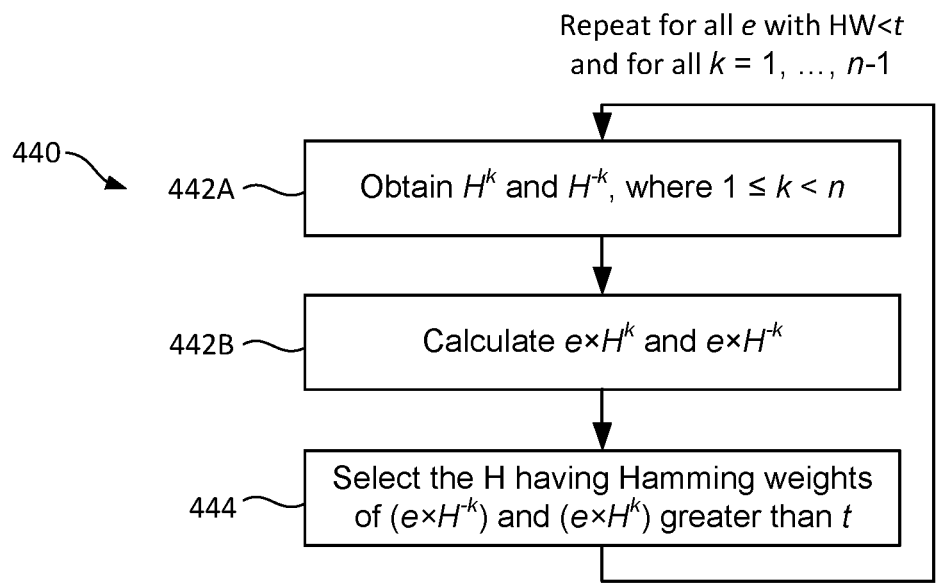
FIG. 9B is a flowchart showing the detail of the fast hash-key value selection process shown in FIG. 9A using shift and XOR operations, according to some other embodiments of this disclosure.

As those skilled in the art will appreciate, the hash-key value selection needs to compute the above multiplications of (e×H$^{-k}$) and (e×H$^k$) in the Galois Field GF($2^N$) at step 442, and then compute the Hamming weights thereof at step 444. FIG. 9B shows the fast hash-key value selection process 440 in some embodiments, which computes the multiplications by using shift and add (that is, XOR) operations.

According to the fast hash-key value selection process 440, the inverse H$^{-1}$ (also denoted the GF inverse) of H in the Galois Field GF($2^N$) is calculated by the hash key selector 316/352 only once using a suitable GF-inverse calculation method such as the extended Euclidean method. The hash-key value candidate H and its GF inverse H$^{-1}$ are cached in the protected cache 320/358. The flag of the protected cache 320/358 remains zero (0).

Then, for any k, H$^k$ and H$^{-k}$ are calculated using the cached H and H$^{-1}$, and (e×H$^{-k}$) and (e×H$^k$) are calculated and tested as described below, which may cause the hash-key value candidate H to be rejected. If H is not rejected after all (e×H$^{-k}$) and (e×H$^k$) are tested, this H is then selected as H$_{select}$. Then, the flag of the protected cache 320/358 is set to one (1) and the hash key selector 316/352 sends Action: termination to the DRBG; otherwise, another hash-key value candidate H is received and the testing process is repeated.

The detail of the fast hash-key value selection process 440 is now described. For ease of description, the following definitions and notions are used through these embodiments:

$f_N(x) = x^{128} + g(x)$, where $g(x)$ is a polynomial with the degree less than 128, that is, deg($g(x)$)<128, wherein $f_N(x)$ is the irreducible polynomial used in Equation (4);

x<<1 represents the shift of x for 1 bit to the left;

$$z = GF\text{ Add}((x \ll 1), g_{msb}) = \begin{cases} GF\text{ Add }((x \ll 1), g), & msb(x) = 1 \\ x \ll 1, & msb(x) = 0 \end{cases};$$

where msb(x) represents the most significant bit of x;

$e_i$ represents a vector of all zero bits except at location i, that is, location i is one but the rest bits are zero (0);

$e = e_{i_1 i_2 \ldots i_v}$, where v≤t, represents an error vector of all zero bits except at locations $i_1, i_2, \ldots, i_v$, which are bit one (1).

As shown in FIG. 9B, at step 442A, the process 440 obtains H$^k$ and H$^{-k}$ (1≤k<n), where H$^1$=H and H$^{-1}$ are obtained from the memory (for example, the protected cache 320 or 358), and H$^k$ and H$^{-k}$ (2≤k<n) are built recursively based on the computation of H$^{k-1}$ and H$^{-(k-1)}$ (calculated at the previous execution of step 442A), that is, H$^k$=H$^{k-1}$×H, H$^{-k}$=H$^{-(k-1)}$×H$^{-1}$ for 1<k<n. As will be described below, shift and add (that is, XOR) operations are used for calculating multiplications of (e×H$^{-k}$) and (e×H$^k$).

At step 442B, (e×H$^{-k}$) and (e×H$^k$) are calculated using shift and add (that is, XOR) operations. Then, the HWs of (e×H$^{-k}$) and (e×H$^k$) are tested (step 444). If any of them is smaller than t, the His rejected and the process 440 is terminated. If the HWs of (e×H$^{-k}$) and (e×H$^k$) are greater than t, steps 442A to 444 are repeated for another e with a HW not equal to zero and having a HW less than or equal to t. After all above-mentioned e's are tested, steps 442A to 444 are repeated for H$^{k+1}$ and H$^{-(k+1)}$ until all above-mentioned e's and all H$^k$ and H$^{-k}$ (1≤k<n) are tested and the H is selected as H$_{select}$. Those skilled in the art will appreciate that steps 442A to 444 for each k may be performed in parallel when parallel threading and multiple memoization are available.

Figure 10:
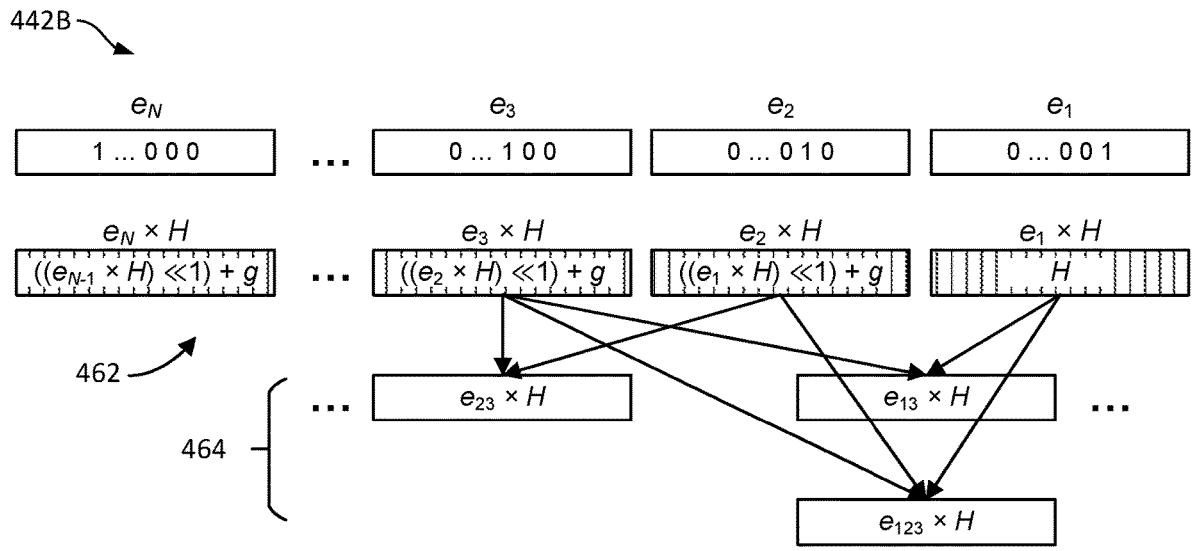
FIG. 10 is a schematic diagram showing a process of hash-key value testing calculation using shift, exclusive-OR (XOR), and memoization, wherein the hatched blocks are written to the memory for further use.

The detail of step 442B is shown in FIG. 10 (using the calculation of (e×H$^k$) as an example; the calculation of e×H$^{-k}$ may be performed in a similar manner) wherein H$^k$ is represented as "H" and GFAdd(($e_{i-1}$×H$^k$)<<1, $g_{msb}$) is represented as "($e_{i-1}$×H)<<1+g" for simplicity.

As shown in FIG. 10, $e_1$×H$^k$, $e_2$×H$^k$, . . . , $e_N$×H$^k$ are calculated using shift and add (that is, XOR) operations and the results are stored in memory (step 462). Then, e×H$^k$=$e_{i_1 i_2 \ldots i_v}$×H$^k$ is calculated by obtaining the results of $e_{i_1}$×H$^k$, $e_{i_2}$×H$^k$, . . . , $e_{i_v}$×H$^k$ from the memory, and adding or XOR-ing them to obtain the result of e×H$^k$ (step 464).

More specifically, for each H$^k$, the following procedure is performed:

(Step 464) if HW(e)=1, where HW(e) is the Hamming weight of e, we compute e×H$^k$ as follows:
(I) if e=$e_1$=1=(000 . . . 01)$_2$ in GF($2^{128}$), then e×H$^k$=H$^k$.
(II) if e=$e_i$=$2^{i-1}$=(0 . . . 010 . . . 00)$_2$ in GF($2^{128}$), then e×H$^k$=$e_i$×H$^k$=GFAdd(($e_{i-1}$×H$^k$)<<1, $g_{msb}$), where i=2, 3, 4, . . . , N.

The results of $e_1$×H$^k$, $e_2$×H$^k$, . . . ,$e_N$×H$^k$ are stored in memory, specifically Mem$_i$=$e_i$×H$^k$. This takes approximately M=128×128=2 KB of data for H$^k$. In some embodiments, such a buffer (that is, Mem$_i$ for all i=1, 2, . . . , N) may be used for testing a plurality of e's in parallel using parallel processing for fast calculation (with expense of memory for storing the results of $e_1$×H$^k$, $e_2$×H$^k$, . . . , $e_N$×H$^k$ and for storing the results of the multiplications of the e's and H$^k$). As those skilled in the art, one may choose how many e's are tested in parallel for making a trade-off between the calculation time and memory requirement based on the need and available system resources.

(Step 464) if HW(e)>1, e×H$^k$ is computed by adding up (XOR-ing) the corresponding components. Let e=$e_{i_1 i_2 \ldots i_v}$. Then, $$e \times H^k = e_{i_1 i_2 \ldots i_v} \times H^k = \left(\sum_{j=1}^{v} e_{i_j}\right) \times H^k = \sum_{j=1}^{v}(e_{i_j} \times H^k) = \sum_{j=1}^{v} Mem_{i_j}, \quad (8)$$

where "Σ" and "+" in this equation and in FIG. 10 represent add or XOR operations.

For example, as shown in FIG. 10, the result of $e_{123}$×H$^k$ may be obtained as $e_1$×H$^k$+$e_2$×H$^k$+$e_3$×H$^k$ (step 464) wherein $e_1$×H$^k$, $e_2$×H$^k$, and $e_3$×H$^k$ are calculated at step 462 and stored in memory. In another example, the result of $e_{23}$×H$^k$ may be obtained as $e_2$×H$^k$+$e_3$×H$^k$ (step 464). In yet another example, the result of $e_{13}$×H$^k$ may be obtained as $e_1$×H$^k$+$e_3$×H$^k$ (step 464).

Step 464 may be performed in parallel according to available resources for q number of H$^{k_1}$, H$^{k_2}$, . . . , H$^{k_q}$ at the same time.

The fast hash-key value selection process 440 shown in FIG. 9B further provides the following advantages:

(1) The "GF inverse" operation in calculating H$^{-k}$ is generally a time-consuming calculation for large numbers. However, in the fast hash-key value selection process 440 shown in FIG. 9B, the GF inverse operation is only employed once in calculating $H^{-1}$, and then cached. The subsequent calculations of $H^{-k}$ (k>1) do not use any GF inverse operation.

The process 440 stores the results of $e_1 \times H^k$, $e_2 \times H^k$, ..., $e_N \times H^k$ at step 462, where each of $e_1, \ldots, e_N$ has a single bit-one (1), which may be denoted the "first-layer memoization" ("memoization" is a technique in computer science for accelerating the execution of computer programs by storing the results of expensive functions and using the stored results when needed). In some other embodiments, step 462 of the process 440 may be extended to other layers (for example, the second-layer memoization wherein the results of $e_{ij} \times H^k$ ($1 \leq i$, $j \leq N$ and $i \neq j$) are stored) if N is sufficiently small or the resources (such as the memory for storing the results to be used later in other evaluations) is sufficiently large. For example, if the results of $e_{i_1 i_2} \times H^k$ and $e_{i_6} \times H^k$ are all available on the memory (such as RAM), $e_{i_1 i_2 i_6} \times H^k$ may be calculated very fast. However, due to memory demanding, the first-layer memoization which demands $N^2 = 128^2 = 2$ KB may be preferable in many embodiments.

If no threading (for parallel computing) is available, for any given k, $N^2$ bits memory is used for storing $e_i \times H^k$. However, this memory is released/reused later for the next k=k+1, and there is no need for a new set of memory allocation therefor.

The process 440 provides various advantages. For example, compared to MAGIC (see Reference [R3]), the process 440 provides higher performance gain, for example, as shown in TABLE 3 below. This performance is achieved without changing the input-output of the hash key selector 316/352 by using the process 440 and related data structure shown in FIGS. 9A, 9B, and 10. Hence, the process 440 has no impact on the security of the system in comparison with MAGIC described in Reference [R3]. Moreover, in TABLE 3, the MAGIC is implemented using the NTL library (C++) (see https://libntl.org/) which is a high-performance number-theory library, and the ETMAC is implemented using standard C++ without thread and hardware acceleration.

(see below), then the error detector 348 determines that there is no error in the received extended-ciphertext blocks and no error correction is required. The verifier 350 then sends the error corrector 354 an "accept" with a no-error indication (the "Accept" branch from the verifier 350 in FIG. 6).

(ii) If $HW(S_{n+1}) \neq 0$ (that is, (i) is not satisfied) and there exists a single $S_r$ ($1 \leq r \leq n$) with the Hamming weight thereof smaller than or equal to the threshold t, that is, $HW(S_r) \leq t$, then the error detector 348 determines that the received extended-ciphertext blocks contain correctable errors (that is, a single erroneous block with no more than t errors). The verifier 350 then sends the error corrector 354 an "accept" with (r, $S_r$) (the "Accept" branch from the verifier 350 in FIG. 6).

The r-th received extended-ciphertext block $C_r'$ contains one or more correctable errors (up to t errors), and $S_r$ is an N-bit block containing bit-one's (1's) in positions that have errors. The verifier 350 then sends the error corrector 354 an "accept" with (r, $S_r$) (the "Accept" branch from the verifier 350 in FIG. 6). The error corrector 354 corrects the errors in block $C_r'$ by XOR-ing $S_r$ with $C_r'$ (that is $C_r' = C_r' + S_r$) to flip the error bits in $C_r'$ for correction and outputs the error-corrected extended-ciphertext blocks as AAD A' (if any) and $E_1', E_2', \ldots, E_{n_E}'$ (wherein $E_1', E_2', \ldots, E_{n_E}'$ are sent to the stream decryptor 356 for decryption).

(iii) If $HW(S_{n+1}) \leq t$ and $HW(S_j) > t$ for all $1 \leq j \leq n$, then the error detector 348 determines that there are up to t errors in the Tag, and no error correction is required. The verifier 350 then sends the error corrector 354 an "accept" with a no-error indication (the "Accept" branch from the verifier 350 in FIG. 6).

(iv) If $HW(S_{n+1}) \leq t$ and there exist two or more $S_j$ ($1 \leq j \leq n$) with $HW(S_j) \leq t$, then the error detector 348 determines that there are up to t errors in the Tag, and no error correction is required. The verifier 350 then sends the error corrector 354 an "accept" with a no-error indication (the "Accept" branch from the verifier 350 in FIG. 6).

TABLE 3

PERFORMANCE GAIN OF THE FAST HASH-KEY VALUE SELECTION METHOD IN COMPARISON WITH MAGIC BY C++ IMPLEMENTATION

|  | 1 bit Error Correction | 2 bit Error Correction | 3 bit Error Correction | 4 bit Error Correction | 5 bit Error Correction |
| --- | --- | --- | --- | --- | --- |
| MAGIC | 2.30 sec | 187.35 sec = 3.122 min | 8738.80 sec = 2.42 hour | 262,468 sec = 3.038 days | 6,528,632 sec = 10.795 weeks |
| ETMAC | 0.30 sec | 11.38 sec | 574.55 sec = 9.56 min | 18750 sec = 5.2 hours | 197000 sec = 2.28 days |

In some embodiments, the decoder 100B (or more specifically, the error detector 348 and the verifier 350) may use an error-detection process to identify the error correctability capability and error location in a way that improves performance and memory usage. More specifically, the error-detection process calculates a plurality of syndromes $S_1, \ldots, S_n, S_{n+1}$ for the received Tag and the received extended-ciphertext blocks $C_1', \ldots C_n'$, where $S_1, \ldots, S_n$ are for the received extended-ciphertext blocks $C_1', \ldots C_n'$, respectively, and $S_{n+1}$ is the syndrome for the received Tag. The decoder 100B then tests the syndromes to determine whether the received Tag and extended-ciphertext blocks contain any errors and whether the errors, if any, are correctable as follows:

(i) If $HW(S_{n+1}) = 0$, that is, $S_{n+1}$ is an all-zero string implying that all other $S_j$ ($1 \leq j \leq n$) are all-zero strings (v) If $HW(S_{n+1}) > t$ and $HW(S_j) > t$ for all $1 \leq j \leq n$, then the error detector 348 determines that the received extended-ciphertext blocks contain uncorrectable errors (i.e., they have two or more erroneous blocks and/or an erroneous block have more than t errors). The verifier 350 then rejects the received Tag and extended-ciphertext blocks by sending a retransmission request 360 (the "Reject" branch in FIG. 6).

(vi) If $HW(S_{n+1}) > t$ and there exist two or more $S_j$ ($1 \leq j \leq n$) with $HW(S_j) \leq t$, then the error detector 348 determines that the received extended-ciphertext blocks contain uncorrectable errors (i.e., they have two or more erroneous blocks and/or an erroneous block have more than t errors). The verifier 350 then rejects the received Tag and extended-ciphertext blocks by sending a retransmission request 360 (the "Reject" branch in FIG. 6).

The error-detection process according to some embodiments of this disclosure is now described. The error-detection process in these embodiments loops to calculate and test the syndromes with each loop iteratively calculating and testing a single syndrome (starting from the calculation and testing of $S_{n+1}$) using stored $H^{-1}$ for computational cost saving purposes. Moreover, the error-detection process may terminate whenever a conclusion (for example, accepting or rejecting the received Tag and extended-ciphertext blocks) is reached, which may further save the computational cost if such as conclusion is reached before all syndromes are calculated.

(1) The decoder 100B fetches $H^{-1}$ from the protected cache 358 once the hash value H is selected for syndrome calculations. In some embodiments, a flag Accept and two registers (including an r register and an $S_r$ register) are used. An N-bit $S_j$ register is also used for storing the currently calculated syndrome. At this step, the flag Accept is initialized to zero (0), the r register is initialized to zero (0), and the $S_r$ register is initialized to an all-zero string.

(2) The decoder 100B calculates $S_{n+1}$=XOR(hashGen, $T_{Rec}$) and stores the calculated $S_{n+1}$ in the $S_j$ register, where XOR( ) represents the XOR operation.

(3) Check the Hamming weight of $S_{n+1}$.

(3-1) If $HW(S_{n+1})$=0, the received extended-ciphertext blocks contain no error. The verifier 350 sends the contents of the j register and/or the $S_j$ register (that is, r=0, and $S_r$ is all-zero) as (r, $S_r$) to the error corrector 354 (the "Accept" branch from the verifier 350 in FIG. 6). The flag Accept is set to one (1). The error-detection process is then terminated. The error corrector 354 checks the received r and/or $S_r$. As r=0, and/or $S_r$ is an all-zero string, the error corrector 354 outputs the received extended-ciphertext blocks to the stream decryptor 356 for decryption.

(3-2) If $HW(S_{n+1}) \leq t$, set the flag Accept to one (1).

(4) Starting from j=n (j in the range of $1 \leq j \leq n$), (4-1) the decoder computes the j-th syndrome $S_j$ as $S_j = S_{j+1} \times H^{-1}$ and stores the calculated $S_j$ in the $S_j$ register.

(4-2) If $HW(S_j) \leq t$, then the error detector 348 checks if any erroneous block has been previously recorded.

(4-2a) If no erroneous block has been previously recorded (that is, r=0 and $S_r$ is an all-zero string), the block number j and its corresponding $S_j$ are recorded in the r and $S_r$ registers, respectively, and the error-detection process goes to step (4-1) for the next j (that is, for j=j−1) until all j's in the range of $1 \leq j \leq n$ are traversed or the error-detection process is terminated in step (4-2b).

(4-2b) If an erroneous block has been previously recorded (for example, the r register is not zero (0) or the $S_r$ register is not an all-zero string), then go to step (5-2).

(5) If all j's in the range of $1 \leq j \leq n$ are traversed, a plurality of tests are performed as follows:

(5-1) If any r and $S_r$ have been recorded (for example, the value of the r register is not 0 and the value of the $S_r$ register is not an all-zero string, meaning that they are the only r and $S_r$ being recorded), the recorded values of r and $S_r$ in the registers are considered as the block number and syndrome of the erroneous block, respectively. The flag Accept is set to one (1). The verifier 350 then sends (r, $S_r$) to the error corrector 354 (the "Accept" branch from the verifier 350 in FIG. 6) and the error-detection process is then terminated.

As those skilled in the art will appreciate, the r-th received extended-ciphertext block $C_r'$ contains one or more correctable errors (up to t errors), and $S_r$ is an N-bit block containing bit-one's (1's) in positions that have errors. The error corrector 354 corrects the errors in block $C_r'$ by XOR-ing $S_r$ with $C_r'$ (that is $C_r'=C_r'+S_r$) to flip the error bits in $C_r'$ for correction and outputs the error-corrected extended-ciphertext blocks as AAD A' (if any) and $E_1'$, $E_2'$, ..., $E_{n_E}'$ (wherein $E_1'$, $E_2'$, ..., $E_{n_E}'$ are sent to the stream decryptor 356 for decryption).

(5-2) If the flag Accept equals one (1), then the verifier 350 sends (r, $S_r$)=(0, 0) to the error corrector 354 (the "Accept" branch from the verifier 350 in FIG. 6). As r=0, and/or $S_r$ is all-zero, the error corrector 354 outputs the received extended-ciphertext blocks to the stream decryptor 356 for decryption, and the error-detection process is then terminated.

(5-3) At this step, (5-1) and (5-2) are not satisfied, and the received extended-ciphertext blocks contain uncorrectable errors. The verifier 350 then rejects the received Tag and extended-ciphertext blocks by sending a retransmission request 360 (the "Reject" branch in FIG. 6).

By using the above method, there is no need to store all syndromes to identify the error locations and whether or not the errors can be corrected. Rather, the identification of the error locations and the determination regarding whether or not the errors can be corrected may be done block by block and terminates very early in case errors are not correctable. This will save memory and processing time to store and calculates syndromes, respectively.

In some embodiments, the exact value of $HW(S_j)$ may not need to be calculated. As the above method only require a comparison between $HW(S_j)$ and the threshold t, the method may scan $S_j$ and count the 1's thereof until more than t ones have been counted or the end of $S_j$ (for example, the end of 128 bits of $S_j$) has been reached. The worst case may require scanning of 128 bits for the Hamming Weight.

In above embodiments, there is no need to store every $HW(S_j)$ or every $S_j$ thereby saving memory. In fact, the decoder 100B only needs, for example, two (2) registers or memory units to store the single erroneous block number r and the corresponding error syndrome $S_r$ associated with the erroneous block, and one N-bit register for temporarily storing the calculated $S_j$. Storing r requires $\lceil \log_2(n+1) \rceil$ bits of memory and storing $S_r$ requires N bits of memory.

In MAGIC, n×N bits for HW vectors, n×N bits for syndrome vectors, and n×N bits for the decoder input data are required. In total, MAGIC requires 3×n×N bits memory. However, the decoder in above embodiments only requires n×N-bit memory for buffering the input data, N-bit memory for storing $S_r$, N-bit memory for temporarily storing the calculated $S_j$, and $\lceil \log_2(n+1) \rceil$ bits memory for storing r. In total, the decoder in above embodiments requires (n+2)×N+ $\lceil \log_2(n+1) \rceil$ bits memory. Thus, the decoder in above embodiments requires much less memory than MAGIC. For example, if N=128 bits and n=1023, then MAGIC needs 47.95 kilobytes (KB) memory. On the other hand, the decoder in above embodiments requires 16.02 KB memory which is about ⅓ of the memory required by MAGIC. In addition, the method in above embodiments has an early termination if errors are not correctable. Therefore, it reaches fast processing time in case of errors cannot be corrected.

With above description, those skilled in the art will appreciate that the DRBG of the encoding and decoding submodules 304 and 356 for H-Selection circuits are in compliance with Standard NIST SP 800-90A Revision 1 Section 10.2. The design is based on using the existing GCM/GMAC hardware circuit (in offline mode) and it does not require a new circuit hardware. Hence, no hardware complexity is added. This design has not been existed before in MACs with ECC (including MAGIC). It may solve the out-of-band hash key agreement problem between the encoder and the decoder.

Those skilled in the art will appreciate that the hash-key value selection method described above is much faster than existing similar module in MAGIC.

Those skilled in the art will appreciate that the decoder design described above uses about one third of the memory (RAM) for processing of the received input stream data at the decoder than existing decoder of MAGIC.

In some embodiments, the ETMAC encoder, decoder, and system disclosed herein may be used as an extension of GCM/GMAC standard NIST SP 800-38D. While the original GCM/GMAC does not offer any ECC, the encoder, decoder, and system disclosed herein may correct some errors per block.

GCM mode is used in the IEEE 802.1AE (MACsec) Ethernet security, IEEE 802.11ad (also dubbed WiGig), ANSI (INCITS) Fiber Channel Security Protocols (FC-SP), IEEE P1619.1 tape storage, IETF IPsec standards, SSH, TLS 1.2 and TLS 1.3. AES-GCM is included in the NSA Suite B Cryptography and its latest replacement in 2018 Commercial National Security Algorithm (CNSA) suite. GCM mode is used in the SoftEther VPN server and client, as well as OpenVPN since version 2.4. As the GCM/GMAC has been already used in above standards/products for the AE, the ETMAC encoder, decoder, and system disclosed herein readily replace the GCM/GMAC in these standard and offer the ECC in addition to the AE.

Figure 11A:
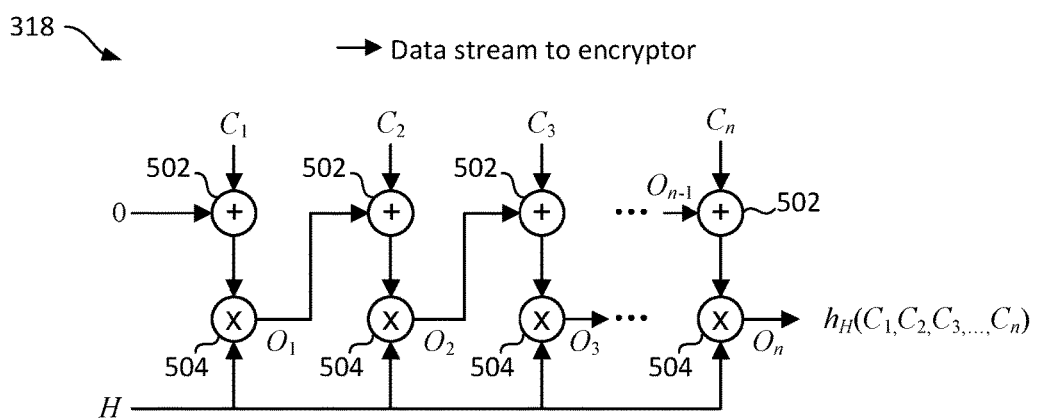
FIG. 11A is a schematic diagram showing the structure of the hash generator shown in FIG. 4, according to some embodiments of this disclosure.

FIG. 11A shows the structure of the hash generator 318 shown in FIG. 4, according to some embodiments of this disclosure. As shown, the hash generator 318 first calculates the multiplication (using the multiplier 504) of the selected hash-key value H and the first block $C_1$ of the extended ciphertext C which generates an output $O_1$. Then, each subsequent block $C_i$ of the extended ciphertext C is added (using the XOR 502) with the previous output $O_{i-1}$ and then multiplied (using the multiplier 504) with the selected hash-key value H. The last output $O_n$ is the hash output $T=h_H(C_1, \ldots, C_n)$.

Figure 11B:
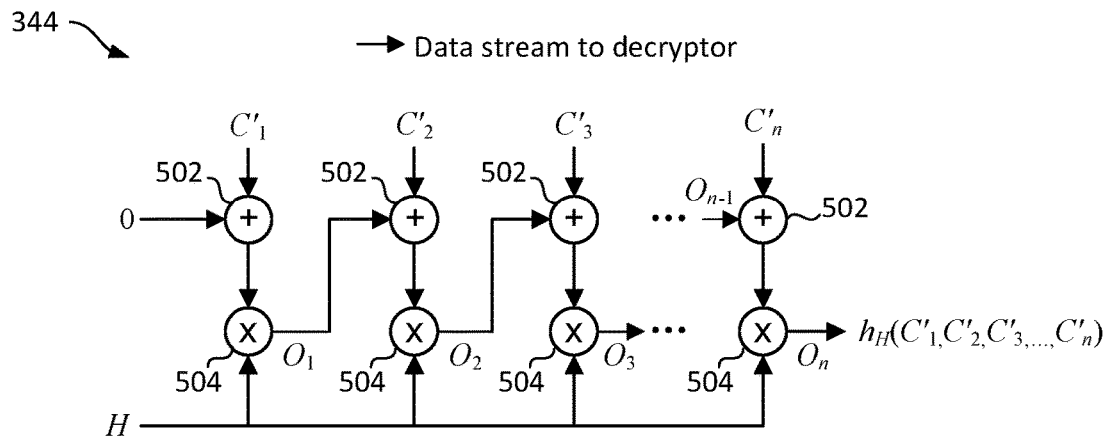
FIG. 11B is a schematic diagram showing the structure of the hash generator shown in FIG. 6, according to some embodiments of this disclosure.

FIG. 11B shows the structure of the hash generator 344 shown in FIG. 6, according to some embodiments of this disclosure. As shown, the hash generator 344 has the same structure as the hash generator 318 shown in FIG. 11A except that the inputs are the blocks $C_1', \ldots, C_n'$ of the received extended ciphertext C'. The last output $O_n$ is the hash output $T=h_H(C_1', \ldots, C_n')$.

Figure 12:
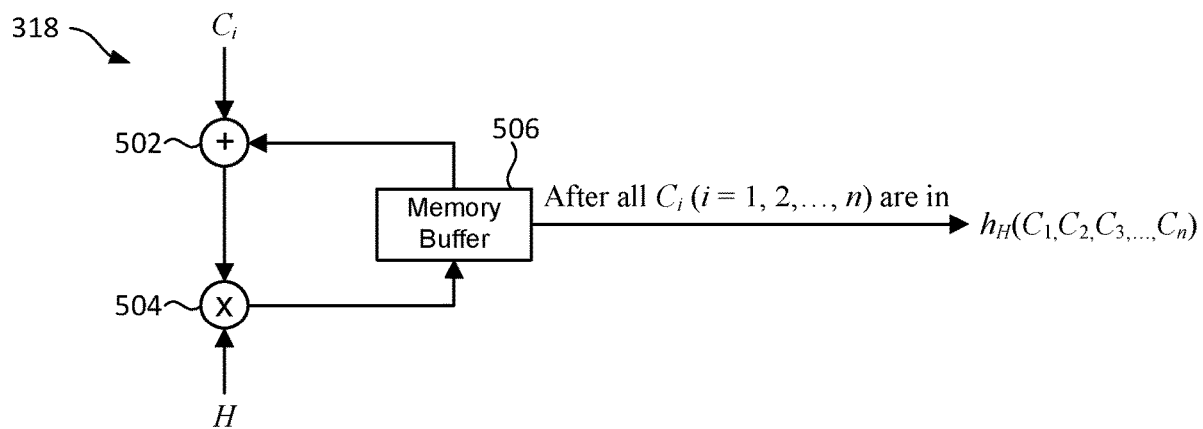
FIG. 12 is a schematic diagram showing the structure of the hash generator shown in FIG. 4, according to some other embodiments of this disclosure.

In some embodiments, the hash generator 318 shown in FIG. 4 may be implemented using the structure shown in FIG. 12. As shown, a memory buffer 506 (such as an N-bit buffer) is used for storing the intermediate calculation result. Initially, the memory buffer 506 is reset to zero (0). Then, each block $C_1, \ldots, C_n$ of the extended ciphertext C is sequentially input into the hash generator 318 and added (using the XOR 502) with the value stored in the memory buffer 506, and then multiplied (using the multiplier 504) with the selected hash-key value H. The output of the multiplier 504 is stored in the memory buffer 506. After the last block $C_n$ of the extended ciphertext C is input into the hash generator 318, the content of the memory buffer 506 is output as the hash output $T=h_H(C_1, \ldots, C_n)$.

By using the hash generator 318 shown in FIG. 12, the hash output T and subsequently the Tag may be calculated in real-time as the extended ciphertext C arrives into the encoder 100A.

In some embodiments, the hash generator 344 shown in FIG. 6 may also be implemented using the structure shown in FIG. 12, wherein the blocks $C_1', \ldots, C_n'$ of the received extended ciphertext C' are sequentially input into the hash generator 344. After the last block $C_n'$ of the received extended ciphertext C' is input into the hash generator 344, the content of the memory buffer 506 is output as the hashGen. Thus, the calculation of the hashGen may be performed in real-time as the received extended ciphertext C' arrives into the decoder 100B.

In some embodiments, the encoder/decoder 100 may be used in a communication device having a transmitter and the receiver at the same location such as a transceiver that combines the transmitter and receiver. The transceiver comprises an encoding and decoding module 100 similar to that shown in FIG. 3, and the encoder 100A and decoder 100B thereof may share some common circuits as described above (using these common circuits at different time slots) but may have different parameters (such as different selected hash-key values). Thus, the transceiver may use the encoding and decoding module 100 as the encoder 100A for encrypting and transmitting data at some time slots and as the decoder 100B for receiving and decrypting data at some other time slots.

In above embodiments, the encoder/decoder 100 comprises a processor 102 functionally coupled to a memory module 104. In some alternative embodiments, the encoder/decoder 100 may only comprise the processor 102 and use an external memory module for data storage as needed.

Those skilled in the art will appreciate that, in some embodiments, the circuits described above may be implemented as hardware circuits, and in some other embodiments, the circuits described above may be implemented as software processes.

In above embodiments, the encoder 100A may be considered a coder module for converting a first text (which is a plaintext) into a second text (which is a ciphertext), and the encoding submodule 304 thereof may be considered a coder for operating as a DRBG in the offline mode for generating one or more hash-key value candidates, and for operating as a stream coder in the online mode for converting the first text into the second text.

Similarly, the decoder 100B may be considered a coder module for converting a first text (which is a ciphertext) into a second text (which is a plaintext), and the decoding submodule 356 thereof may be considered a coder for operating as a DRBG in the offline mode for generating one or more hash-key value candidates, and for operating as a stream coder in the online mode for converting the first text into the second text.

C. ACRONYM KEY

AAD: Additional Authenticated Data
AE: Authenticated Encryption
ETMAC: Error-Tolerant Message Authentication Code
MAGIC: Message Authentication, Galois Integrity and Correction MAC: Message Authentication Code
GCM: Galois Counter Mode
GMAC: Galois Message Authentication Code
ECC: Error Correction Capability
DRBG: Deterministic Random Bit Generator
FEC: Forward Error Correction
NIST: National Institute of Standards and Technology
SP: Special Publication
SW: Software
GE: Gate Equivalent
RAM: Random Access Memory

D. REFERENCES

[R1] D. A. McGrew and J. Viega, "The Galois/Counter Mode of Operation (GCM)," https://csrc.nist.rip/groups/ST/toolkitBCM/documents/proposedmodes/gcm/gcm-spec.pdf.

[R2] D. S. S. G. D. M. a. D. R. C. A. Sengupta, "AEC: A Practical Scheme for Authentication with Error Correction," in Proceedings of SPACE, LNCS, 2014.

[R3] D. D. S. D. K. M. a. D. W. M. Kounavis, "The MAGIC Mode for Simultaneously Supporting Encryption, Message Authentication and Error Correction," Cryptology ePrint Archive: Report 2020/1460, February 2021.

[R4] H. Krawczyk, "LFSR-based Hashing and Authentication," in Proceedings of CRYPTO, LNCS, 1994.

[R5] G. G. a. S. A. V. C. C. Y. Lam, "Message Authentication Codes with Error Correcting Capabilities," in Proceedings of ICICS 2002 LNCS, 2002.

[R6] C. G. Boncelet, "The NTMAC for Authentication of Noisy Messages," vol. 1(1), no. C. G. Boncelet, The NTMAC for Authentication of Noisy Messages, vol. 1(1), pp. 35-42, 2006, pp. 35-42, 2006.

[R7] Y. L. a. C. G. Boncelet, "The CRC-NTMAC for Authentication of Noisy Messages," vol. 1(4), pp. 517-523, 2006.

[R8] Y. L. a. C. G. Boncelet, "The BCH-NTMAC for Authentication of Noisy Messages," in Proceedings of the 40th Annual Conference on Information Sciences and Systems, 2006.

[R9] L. C. a. M. Wegman, "Universal classes of hash functions," Journal of Computer and System Sciences, vol. 18, no. 2, pp. 143-154, 1979.

[R10] M. a. G. J. a. M. Y. a. P. N. Dietzfelbinger, "Polynomial Hash Functions are Reliable," in International Colloquium on Automata, Languages, and Programming, Springer, 1992, pp. 235-246.

[R11] M. Dworkin, "Recommendation for Block Cipher Modes of Operation: Galois/Counter Mode (GCM) and GMAC," NIST Special Publication (SP) 800-38d, 2007.

[R12] J. M. K. E. B. Barker, "Recommendations for Random Generation Using Deterministic Random Bit Generators," Special Publication (SP), 2015.

Although embodiments have been described above with reference to the accompanying drawings, those of skill in the art will appreciate that variations and modifications may be made without departing from the scope thereof as defined by the appended claims.

What is claimed is:

1. A module for use in a secure device or system for converting a first data into a second data, one of the first and second data being a plaintext and the other of the first and second data being a ciphertext, the module comprising circuitry for:

generating one or more hash-key value candidates using a deterministic random bit generator (DRBG) in an offline mode;
selecting, from the one or more hash-key value candidates, a hash-key value that is suitable for error correction;
converting the first data into the second data in an online mode; and
generating a message authentication code (MAC) tag using at least the ciphertext and the selected hash-key value.

2. The module of claim 1, wherein the circuitry comprises a first circuit for said generating the one or more hash-key value candidates using the DRBG in the offline mode and a second circuit for said converting the first data into the second data in the online mode; and wherein at least a major portion of the first circuit is same as a major portion of the second circuit.

3. The module of claim 1, wherein the circuitry comprises a circuit for said operating as the DRBG in the offline mode and for said converting the first data into the second data in the online mode.

4. The module of claim 1, wherein the circuitry comprises a circuit using an Advanced Encryption Standard (AES)-counter mode (AES-CTR) encryption or decryption function for said generating the one or more hash-key value candidates using the DRBG in the offline mode and for converting the first data into the second data in the online mode.

5. The module of claim 1, wherein the circuitry is configured for generating a MAC tag based on a GHASH function using at least the ciphertext and the selected hash-key value.

6. The module of claim 1, wherein the circuitry is configured for:
generating a hash output using at least the ciphertext and the selected hash-key value; and
generating the MAC tag or generating a de-randomized output;
generating a first key using a nonce IV in the online mode;
using the first key and the hash output to generate the MAC tag; and
using the first key and the MAC tag to generate the de-randomized output.

7. The module of claim 6, wherein the circuitry is configured for generating the first key by encrypting (IV∥$0^{31}$∥1) using a second key.

8. The module of claim 6, wherein the circuitry is configured for performing an addition of the first key and the hash output in a Galois Field GF($2^N$) to generate the MAC tag.

9. The module of claim 8, wherein the addition of the first key and the hash output in the Galois Field GF($2^N$) is an N-bit exclusive-OR (XOR) operation.

10. The module of claim 6, wherein the circuitry further comprises a cache for storing the selected hash-key value and an inverse of the selected hash-key value in a Galois Field GF($2^N$).

11. The module of claim 6, wherein the circuitry is configured for:
for each hash-key value candidate H,
calculating (e×$H^{-k}$) and (e×$H^k$) for all errors e not equal to zero and having a Hamming weight less than or equal to a threshold t and for all k where 1≤k≤n−1; and
if the Hamming weights of (e×$H^{-k}$) and (e×$H^k$) are greater than t, selecting the hash-key value candidate H as the selected hash-key value.

12. The module of claim 11, wherein said calculating $(e \times H^k)$ comprises:

calculating $H^k$ for $1 \leq k \leq n$ as $H^1 = H$ or $H^k = H^{k-1} \times H$ for $1 < k \leq n$;

calculating and storing $e_1 \times H^k, e_2 \times H^k, \ldots, e_N \times H^k$ using shift and XOR operations, where $e_i$ represents a vector of all zero bits except a bit-one at location i (i=1, 2, ..., N); and calculating $(e \times H^k)$ based on the stored $e_1 \times H^k$, $e_2 \times H^k, \ldots, e_N \times H^k$ and using XOR operations.

13. The module of claim 12, wherein said calculating and storing $e_1 \times H^k, e_2 \times H^k, \ldots, e_N \times H^k$ comprises:

if $e = e_1 = 1 = (000 \ldots 01)_2$ in $GF(2^{128})$, then $e \times H^k = H^k$; and if $e = e_i = 2^{i-1} = (0 \ldots 010 \ldots 00)_2$ in $GF(2^{128})$, then $e \times H^k = e_i \times H^k = GFAdd((e_{i-1} \times H^k) \ll 1, g_{msb})$, where i=2, 3, 4, ..., N, $$GF \, Add \, ((x \ll 1), g_{msb}) = \begin{cases} GF \, Add \, ((x \ll 1), g), & msb(x) = 1 \\ x \ll 1, & msb(x) = 0 \end{cases},$$

msb(x) represents the most significant bit of x, x<<1 represents the shift of x for 1 bit to the left, and $f_N(x) = x^{128} + g(x)$, where g(x) is a polynomial with the degree less than 128, and $f_N(x)$ is an irreducible polynomial for calculating the hash output $T = h_H(C_1, \ldots, C_n) = \sum_{i=1}^n C_i H^{n+1-i} \mod f_N(x)$.

14. The module of claim 6, wherein the module is for decrypting the ciphertext into the plaintext;

wherein said converting the first data into the second data in the online mode comprises:

decrypting the first data into the second data in the online mode;

wherein the circuitry is configured for generating a de-randomized output; and wherein the circuitry is further configured for:

detecting one or more errors in the ciphertext and/or the MAC tag using the selected hash-key value, the hash output, and the de-randomized output, and generating one or more syndromes;

assessing the syndromes and verifying if the detected one or more errors are correctable; and correcting the detected one or more errors and generating an error-corrected ciphertext for decrypting into the second data if the detected one or more errors are correctable.

15. The module of claim 14, wherein each of the ciphertext and the MAC tag comprises a plurality of blocks; and wherein said assessing the syndromes and verifying if the detected one or more errors are correctable comprises:

determining that the detected one or more errors are correctable if the one or more errors in a same block and if a total number of the detected one or more errors is smaller than or equal predefined threshold.

16. The module of claim 6, wherein the circuitry is configured for performing a process having the steps of:

(1) fetching from a storage an inverse $H^{-1}$ of the selected hash-key value in a Galois Field $GF(2^N)$ and setting a flag to a first value;

(2) computing $S_{n+1}$ as an XOR of the hash output and the de-randomized output;

(3-1) if a Hamming weight of $S_{n+1}$ is zero, setting a flag to a second value, decrypting the ciphertext into the second data, and terminating the process;

(3-2) if the Hamming weight of $S_{n+1}$ is smaller than or equal to t, setting the flag to the second value, (4) setting j=n, (4-1) computing $S_j$ as $S_{j+1} \times H^{-1}$, (4-2) if the Hamming weight of $S_j$ is smaller than or equal to a threshold t, then (4-2a) if no r and $S_r$ have been previously recorded, recording j and $S_j$ as the r and $S_r$ and go to step (4-1) for a next j=j−1 until all j's in the range of $1 \leq j \leq n$ are traversed or the process is terminated in step (4-2b), (4-2b) if the r and S, have been previously recorded, then go to step (5-2), (5) if all j's in the range of $1 \leq j \leq n$ are traversed, (5-1) if the r and $S_r$ have been previously recorded, setting a flag to the second value, using the recorded r and $S_r$ for correcting errors in the ciphertext, and terminating the process, (5-2) if the flag is the second value, then decrypting the ciphertext into the second and terminating the process, and (5-3) rejecting the ciphertext.

17. A method for use in a secure device or system for converting a first data into a second data, one of the first and second data being a plaintext and the other of the first and second data being a ciphertext, the method comprising:

generating one or more hash-key value candidates using a deterministic random bit or (DRBG) in an offline mode;

selecting, from the one or more hash-key value candidates, a hash-key value that is suitable for error correction;

converting the first data into the second data in an online mode; and generating a message authentication code (MAC) tag using at least the ciphertext and the selected hash-key value.

18. The method of claim 17 further comprising:

generating a hash output using at least the ciphertext and the selected hash-key value;

generating the MAC tag or a de-randomized output; and generating a first key using a nonce IV in the online mode;

wherein said generating the MAC tag or the de-randomized output comprises:

using the first key and the hash output to generate the MAC tag, or using the first key and the MAC tag to generate the de-randomized output.

19. One or more non-transitory computer-readable storage devices comprising computer-executable instructions for use in a secure device or system for converting a first data into a second data, one of the first and second data being a plaintext and the other of the first and second data being a ciphertext, wherein the instructions, when executed, cause a processor to perform actions comprising:

generating one or more hash-key value candidates using a deterministic random bit generator (DRBG) in an offline mode;

selecting, from the one or more hash-key value candidates, a hash-key value that is suitable for error correction;

converting the first data into the second data in an online mode; and generating a message authentication code (MAC) tag using at least the ciphertext and the selected hash-key value.

20. The one or more non-transitory computer-readable storage devices of claim 19, wherein the instructions, when executed, cause the processor to perform further actions comprising:
- generating a hash output using at least the ciphertext and the selected hash-key value;
- generating the MAC tag or a de-randomized output; and
- generating a first key using a nonce IV in the online mode;
- wherein said generating the MAC tag or the de-randomized output comprises:
  - using the first key and the hash output to generate the MAC tag, or
  - using the first key and the MAC tag to generate the de-randomized output.

* * * * *